(12) United States Patent
Matsumoto et al.

(10) Patent No.: US 7,828,295 B2
(45) Date of Patent: Nov. 9, 2010

(54) GAME INFORMATION, INFORMATION STORAGE MEDIUM AND GAME APPARATUS

(75) Inventors: Shingo Matsumoto, Yokohama (JP); Takanobu Unakami, Koutou-ku (JP)

(73) Assignee: Namco Bandai Games Inc., Tokyo (JP)

( * ) Notice: Subject to any disclaimer, the term of this patent is extended or adjusted under 35 U.S.C. 154(b) by 581 days.

(21) Appl. No.: 10/555,273

(22) PCT Filed: May 19, 2004

(86) PCT No.: PCT/JP2004/006743

§ 371 (c)(1),
(2), (4) Date: Nov. 2, 2005

(87) PCT Pub. No.: WO2004/101095

PCT Pub. Date: Nov. 25, 2004

(65) Prior Publication Data

US 2007/0015588 A1 Jan. 18, 2007

(30) Foreign Application Priority Data

May 19, 2003 (JP) .............................. 2003-140232

(51) Int. Cl.
*A63F 3/00* (2006.01)
*A63F 9/24* (2006.01)
*A63F 13/00* (2006.01)
*G06F 17/00* (2006.01)
*G06F 19/00* (2006.01)

(52) U.S. Cl. ......................................... 273/238; 463/39
(58) Field of Classification Search .................. 463/38, 463/39; 273/237, 238, 289
See application file for complete search history.

(56) References Cited

U.S. PATENT DOCUMENTS 5,013,047 A * 5/1991 Schwab ...................... 273/238
5,821,916 A * 10/1998 Watson et al. ............... 345/673

(Continued)

FOREIGN PATENT DOCUMENTS

JP        A-61-259331        11/1986

(Continued)

OTHER PUBLICATIONS

MobyGames.com, "The Art of Fighting," MobyGames, http://www.mobygames.com/game/art-of-fighting, Accessed: Mar. 21, 2008, Created: Apr. 5, 2005.*

(Continued)

*Primary Examiner*—Dmitry Suhol
*Assistant Examiner*—Reginald A. Renwick
(74) *Attorney, Agent, or Firm*—Oliff & Berridge, PLC

(57) ABSTRACT

Game information is provided that includes a table, a formed object incorporating a coil and a memory for storing identification information on the formed object. When a formed object is placed on the tablet, the apparatus obtains from the input system a placed position and direction on the tablet, and identification information on the formed object. The apparatus can detect a change of the placed position and the direction obtained from the input system, select character information corresponding to the identification information, dispose the character in a game space, control motion and movement of the character according to the change detected, and generate an image in the game space including the character controlled by the character control unit.

18 Claims, 19 Drawing Sheets

U.S. PATENT DOCUMENTS 7,133,031 B2 * 11/2006 Wang et al. .................. 345/173

FOREIGN PATENT DOCUMENTS

| JP | A-02-244214 | 9/1990 |
| JP | A 07-323109 | 12/1995 |
| JP | A-2002-939 | 1/2002 |
| JP | A 2002-99385 | 4/2002 |
| JP | A 2002-156896 | 5/2002 |
| JP | A 2002-219279 | 8/2002 |
| JP | 2002301264 A * | 10/2002 |
| JP | A 2002-301264 | 10/2002 |
| JP | A 2002-325970 | 11/2002 |
| JP | A 2002-355441 | 12/2002 |
| JP | A 2003-103045 | 4/2003 |

OTHER PUBLICATIONS

GameFAQs: Star Fox(SNES), http://www.gamefaqs.com/console/snes/file/588690/35945, Accessed Mar. 23, 2009. Created Apr. 22, 2005.*

IGN: Star Fox, http://cheats.ign.com/objects/007/007705.html, Accessed Mar. 23, 2009.*

Atari Archives, http://www.atariarchives.org/cfn/09/07/0005.php, Accessed Apr. 4, 2009. Created Mar. 21, 1994.*

* cited by examiner

| DETECTION AREA COORDINATE | FIGHTING AREA COORDINATE |
|---|---|
| $(A_0, B_0)$ | $(a_\alpha, b_\alpha, c_\alpha)$ |
| $(A_0, B_y)$ | $(a_\beta, b_\beta, c_\beta)$ |
| $(A_x, B_0)$ | $(a_\gamma, b_\gamma, c_\gamma)$ |
| $(A_x, B_y)$ | $(a_\delta, b_\delta, c_\delta)$ |

FIG.14

| MODEL CODE | CHARACTER NAME | FIGURE | CHARACTER DATA | ACTION DATA (L10) |
|---|---|---|---|---|
| K01 | GIGAROCK | DINOSAUR | GIGAROCK CHARACTER DATA | GIGAROCK ACTION DATA |
| K02 | PICONURSE | HUMAN | PICONURSE CHARACTER DATA | PICONURSE ACTION DATA |
| K03 | HAKU | CAT | HAKU CHARACTER DATA | HAKU ACTION DATA |
| ... | ... | ... | ... | ... |

| STATE CHANGE ITEM | ACTION PATTERN | |
|---|---|---|
| MOVE | MOVE TO POSITION CORRESPONDING TO PRESENT PLACED POSITION | ~ L20 |
| RIGHT-TURN | ATTACK MOTION WITH WEAPON "SHIELD" HELD IN ITS LEFT HAND | ~ L22 |
| LEFT-TURN | ATTACK MOTION WITH WEAPON "SWORD" HELD IN ITS RIGHT HAND | ~ L24 |
| HIGH-SPEED MOVE | DISTANCE BETWEEN OPERATIONAL-OBJECT CHARACTER AND ENEMY CHARACTER < THRESHOLD VALUE V: DIRECT ATTACK MOTION WITH WEAPON "SWORD" HELD IN ITS RIGHT HAND, DISTANCE BETWEEN OPERATIONAL-OBJECT CHARACTER AND ENEMY CHARACTER ≥ THRESHOLD VALUE V:REMOTE ATTACK OPERATION USING WEAPON "STONE". | ~ L26 |
| DOUBLE TAPS | ATTACK MOTION BY DISPOSING SUMMONED CHARACTER | ~ L28 |
| ⋮ | ⋮ | |

FIG.16

| ID CODE | CHARACTER NAME | PARAMETER INFORMATION |
|---|---|---|
| K15_00333 | ARCHY | PARAMETER INFORMATION A |
| K03_00073 | HAKU | PARAMETER INFORMATION B |
| ⋮ | ⋮ | ⋮ |

| STATE CHANGE ITEM | | ACTION PATTERN |
|---|---|---|
| MOVE | PATH SHAPE: ⟲ | MAGIC ATTACK OPERATION BY "MAGIC A" |
| | PATH SHAPE: ⟳ | MAGIC ATTACK OPERATION BY "MAGIC B" |
| | PATH SHAPE: △ | MAGIC ATTACK OPERATION BY "MAGIC C" |
| | ⋮ | ⋮ |

GAME INFORMATION, INFORMATION STORAGE MEDIUM AND GAME APPARATUS

TECHNICAL FIELD

The present invention relates to game information, an information storage medium for storing the game information, and a game apparatus.

BACKGROUND ART

There has been known such a technology that a position detecting device, such as a digitizer, is applied to a game apparatus, the position detecting device having a combination of a coordinates pointing device and a pointed-coordinates detecting device. For example, as disclosed in Patent Document 1, there has been known a game apparatus for playing shogi (Japanese chess) that includes a chessboard as a digitizer and a chess piece as a pointer to be placed on the digitizer. Specifically, the digitizer has a sensor to detect a position of the pointer in such a way that an induction voltage is induced in a loop coil provided in the sensor side corresponding to a radio wave generated by a coil in a tuning circuit embedded in the pointer. Further, the digitizer detects a direction and the front and back surfaces of the pointer such that the output level of the radio wave output from the pointer-side coil differs in the front and rear sides and the front and back surfaces of the pointer.

On the other hand, with the recent advance in RFID (radio frequency identification) technology, a technique of RFID data carriers applied to in a game field has been known. For example, as disclosed in Patent document 2, when a game piece on hand is placed in a communication area of an RFID reader-writer before starting a game, ID information stored in the game piece is read out, and a data carrier list is produced with the read ID information associated with a player. After starting the game, when the game piece is placed in the communication area of the RFID reader-writer, the ID information is read, and it is determined to which player the placed game piece belongs with reference to the data carrier list. For example, when a game piece, having a figure formed in a game item, is placed in the communication area of the RFID reader-writer, it is checked to which player the read ID information corresponds in the data carrier list, and the effect due to the use of the game item is attributed to the corresponding player.

Patent document 1: JP-Tokukai-Hei-07-323109A
Patent document 2: JP-Tokukai-200-325970A

DISCLOSURE OF THE INVENTION

Problem to be Solved by the Invention

However, in the technology disclosed in patent document 2, when the game piece is placed in the communication area of the RFID reader-writer as an object to be detected, the player to whom the game piece belongs is identified, so that the object like a character simply appears in a game space as a supporter of the player side. In the technology disclosed in patent document 1, the digitizer detects a plurality of pointers placed thereon as objects to be detected, and also detects the direction and the front and back surfaces of each pointer to proceed the game, but when the placed position or direction of the pointer changes on the digitizer, processing is not executed corresponding to the amount of change, directional change, or a moving path of the pointer. An object of the invention is to provide a game apparatus in which movement of a character appearing in a game space is controlled depending on input operations for a placed object to be detected.

Means to Solve the Problems

In order to achieve the object mentioned above, in a first aspect of the invention, game information causes an apparatus similar to a computer to function, the apparatus connected to an input system that includes a tablet using an electromagnetic induction method and a formed object, the formed object including a coil for performing predetermined communication using the electromagnetic induction method when placed on the tablet, and a memory for storing identification information on the formed object, so that, when the formed object is placed on the tablet, the apparatus obtains from the input system the placed position and the direction on the tablet, and identification information on the formed object, wherein the apparatus is caused to function as: a change detecting unit (for example, state change detecting section 224 in FIG. 10) for detecting a change of the placed position and the direction obtained from the input system; a selecting unit (for example, fight controller 222 in FIG. 10) for selecting character information corresponding to the identification information obtained from the input system out of a plurality of character information, each character information (for example, toy character information 460 in FIG. 14) including image information on a character imitating a figure of the formed object and associated with the identification information on the formed object (for example, ID code in FIG. 9B); a character control unit (for example, fight controller 222 in FIG. 10) for disposing the character, imitating the figure of the formed object placed on the tablet, in a game space according to the character information selected by the selecting unit, and for controlling motion and movement of the character according to the change detected by the change detecting unit; and an image generating unit (for example, image generating section 240 in FIG. 10) for generating an image in the game space including the character controlled by the character control unit.

Here, the game information unit information approximately the same as programs applied to processing by a computer such as the game apparatus.

In accordance with a second aspect of the invention, a game apparatus, which is connected to an input system comprising: a tablet using an electromagnetic induction method; and a formed object incorporating a coil for performing predetermined communication with the tablet using an electromagnetic induction method when placed on the tablet, and a memory for storing identification information on the formed object, so that the apparatus obtains from the input system a placed position and a direction on the tablet, and identification information on the formed object when the formed object is placed on the tablet, comprises: a change detecting unit for detecting a change of the placed position and the direction obtained from the input system; a selecting unit for selecting character information corresponding to the identification information obtained from the input system out of a plurality of character information, each of which includes image information on a character imitating a figure of the formed object and is associated with the identification information on the formed object; a character control unit for disposing the character, imitating the figure of the formed object placed on the tablet, in a game space according to the character information selected by the selecting unit, and for controlling motion and movement of the character according to the change detected by the change detecting unit; and an image generating unit for generating an image in the game space including the character controlled by the character control unit.

According to the first or second aspect of the invention, the apparatus can select the character information including the image information on the character imitating the figure of the formed object, based on the identification information on the formed object placed on the tablet, and dispose the character imitating the figure of the formed object in the game space, based on the selected character information. Further, the apparatus can control the motion and movement of the character based on the change of the placed position and direction of the formed object placed on the tablet.

Preferably, in the above-described game information, the apparatus further functions as a correlating area setting unit (for example, fight controller 222 in FIG. 10) for setting in the game space an area correlating with a placement detectable area on the tablet, and the character control unit disposes the character, imitating the figure of the formed object placed on the tablet, at a position in the game space correlating with the placed position obtained from the input system with the direction obtained from the input system with reference to the area in the game space set by the correlating area setting unit.

With this, an area in the game space is set correlated with the placement detectable area. Referring to the set area in the game space, the character imitating the figure of the formed object can be disposed at the position in the game space correlating with the placed position of the formed object placed on the tablet.

Preferably, in the game information, the correlating area setting unit includes an area variable unit for making the size of the area in the game space variable, the size being set correlating with the placement detectable area on the tablet.

With this, the size of the area in the game space correlating with the placement detectable area on the tablet is made variable.

Preferably, in the game information, the area variable unit includes a first variable unit for making the size of the area in the game space variable, the size set according to and corresponding to the character information selected by the selecting unit.

With this, the size of the area in the game space correlating with the placement detectable area on the tablet can be varied according to the character information on the character imitating the formed object placed on the tablet.

Preferably, in the game information, the area variable unit includes a second variable unit for making the size of the area in the game space variable, the size set according to and corresponding to game progress.

With this, the size of the area in the game space correlating with the placement detectable area on the tablet can be varied according to the game progress.

Preferably, in the game information, the formed object includes a pressure detecting part embedded therein for detecting pressure applied thereto from the outside thereof, the input system includes a detecting unit for detecting the pressure detected by the pressure detecting part with predetermined communication, the apparatus obtains from the input system the pressure detected by the detecting unit, and the character control unit controls motion and movement of the character based on the pressure obtained from the input system.

With this, the apparatus can detect the pressure applied from the outside to the formed object placed on the tablet, and control motion and movement of the character imitating the figure of the formed object placed in the game space, based on the detected pressure applied to the formed object.

In a third aspect of the invention, game information causes an apparatus similar to a computer to function, the apparatus connected to an input system, the input system comprising: a tablet using an electromagnetic induction method; and a printed matter, which has a character picture printed on the printing surface thereof, incorporating a coil for performing predetermined communication using an electromagnetic induction method when placed on the tablet, and a memory for storing identification information on the printed matter, so that, when the printed matter is placed on the tablet, the apparatus obtains from the input system a placed position and a direction on the tablet, and identification information on the printed matter, wherein the apparatus is caused to function as: a change detecting unit for detecting a change of the placed position and the direction obtained from the input system; a selecting unit for selecting character information corresponding to the identification information obtained from the input system from a plurality of character information, each of which includes image information on the character printed on the printed matter and is associated with the identification information on the printed matter; a character control unit for disposing the character, printed on the printed matter placed on the tablet, in a game space according to the character information selected by the selecting unit, and for controlling motion and movement of the character according to the change detected by the change detecting unit; and an image generating unit for generating an image in the game space including the character controlled by the character control unit.

In a fourth aspect of the invention, a game apparatus, which is connected to an input system comprising: a tablet using an electromagnetic induction method; and a printed matter, which has a character picture on a printing surface thereof, incorporating a coil for performing predetermined communication using an electromagnetic induction method when placed on the tablet, and a memory for storing identification information on the printed matter, so that the apparatus obtains from the input system a placed position and a direction on the tablet, and identification information on the printed matter when the printed matter is placed on the tablet, comprises: a change detecting unit for detecting a change of the placed position and the direction obtained from the input system; a selecting unit for selecting character information corresponding to the identification information obtained from the input system out of a plurality of character information, each of which includes image information on a character printed on the printed matter and is associated with the identification information on the printed matter; a character control unit for disposing the character, printed on the printed matter placed on the tablet, in a game space according to the character information selected by the selecting unit, and for controlling motion and movement of the character according to the change detected by the change detecting unit; and an image generating unit for generating an image in the game space including the character controlled by the character control unit.

According to the third or the fourth aspect of the invention, the apparatus can select the character information including the image information on the character printed on the printed matter, based on the identification information on the printed matter placed on the tablet, and dispose the character printed on the printed matter in the game space, based on the selected character information. Further, the apparatus can control the motion and movement of the character based on the change of the placed position and direction of the printed matter placed on the tablet.

Preferably, in the game information, the change detecting unit includes a turn detecting unit for detecting a turn direction and/or an amount of turn by detecting a change per predetermined unit time for the direction obtained from the input system, and the character control unit controls motion and movement of the character based on the turn direction and/or the amount of turn detected by the turn detecting unit.

With this, by detecting the change per predetermined unit time for the direction of the formed object or the printed matter placed on the tablet, the apparatus can detect the turn direction and/or the amount of turn for the formed object or the printed matter. The apparatus can also control motion and movement of the character imitating the figure of the formed object or the character printed on the printed matter disposed in the game space, based on the detected turn direction and/or the detected amount of turn for the formed object or the printed matter.

Preferably, in the game information, the change detecting unit includes a speed detecting unit for detecting a speed by detecting a change per predetermined unit time for the placed position obtained from the input system, and the character control unit controls motion and movement of the character based on the speed detected by the speed detecting unit.

With this, by detecting the change per predetermined unit time for the placed position, the apparatus can detect the moving speed of the formed object or the printed matter. The apparatus can also control motion and movement of the character imitating the figure of the formed object or the character printed on the printed matter disposed in the game space, based on the detected moving speed of the formed object or the printed matter.

Preferably, in the game information, the change detecting unit includes a path detecting unit for detecting a path by detecting a continuous change of the placed position obtained from the input system, and the character control unit controls motion and movement of the character based on the path detected by the path detecting unit.

With this, by detecting the continuous change of the placed position of the formed object or the printed matter placed on the tablet, the apparatus can detect the moving path of the formed object or the printed matter. The apparatus can also control motion and movement of the character imitating the figure of the formed object or the character printed on the printed matter disposed in the game space, based on the detected moving path of the formed object or the printed matter.

According to a fifth aspect of the invention, an information storage medium stores the game information according to the first aspect or the third aspect, and is readable by the apparatus similar to a computer With this, the apparatus similar to a computer can read out the game information from the information storage medium to execute arithmetic processing, thereby implementing an information storage medium achieving the same effect as in the game information described above.

Effects of the Invention

According to the invention, the game apparatus can select the character information including the image information on the character imitating the figure of the formed object, based on the identification information on the formed object placed on the tablet, and dispose the character imitating the figure of the formed object in the game space, based on the selected character information. Further, the apparatus can control the motion and movement of the character based on the change of the placed position and direction of the formed object placed on the tablet.

BRIEF DESCRIPTION OF DRAWINGS

FIG. 13 is a diagram showing one example of a detection area/fighting area correlation table;

FIG. 14 is a diagram showing one example of toy character information;

FIG. 15 is a diagram showing one example of action data;

FIG. 16 is a diagram showing one example of player-holding toys information;

FIG. 18 is a diagram showing one example of action patterns of the operational-object character according to the move operation of the toy on the input pad.

BEST MODE FOR CARRYING OUT OF THE INVENTION

The present embodiment is an embodiment relating to a game apparatus to carry out a game called RPG (role playing game), which progresses depending on determination by a player, and more particularly an embodiment in which the present invention is applied to fighting scenes of the RPG. A detail description will now be given of the game apparatus, to which the invention is applied, with reference to the drawings.

[Outline of the Game Apparatus]

Figure 1:
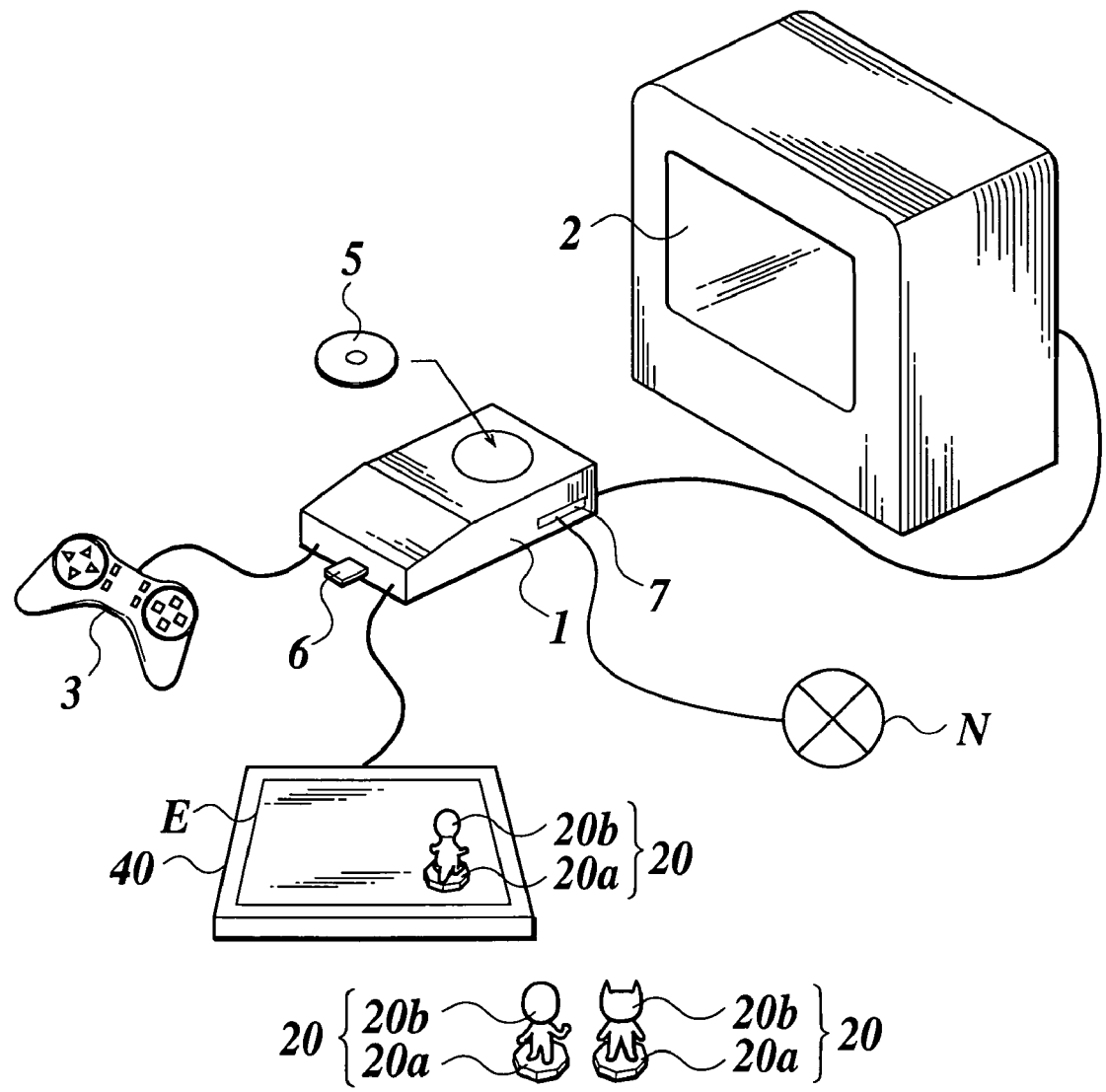
FIG. 1 illustrates one example of a general view of a game apparatus in case that the game apparatus of the present invention is applied to a home-use game system.

FIG. 1 shows a general view of a home-use game system to which the game apparatus of the present invention is applied. As shown in FIG. 1, a game-system host device 1 is connected to a display 2, a game controller 3, and an input pad 40. An information storage medium 5, such as a CD-ROM and a DVD, is used as an information storage medium for storing game information, which is the information, such as game programs and game data, necessary for performing a game, the medium 5 being attachable to and detachable from the host device 1. An information storage medium 6, such as a memory card and an IC card, is also used as an information storage medium to be written therein playing data including information associated with game progress and generated according to a given timing and a save operation by the player. The host device 1 executes various processes according to the information stored in these information storage mediums 5 and 6.

The game information may be obtained from an external device through a communication device 7 provided in the host device 1, the communication device 7 connected to a communication line N. The communication line N means a communication path through which data can be sent and received. That is, it means not only a LAN, such as a dedicated line (dedicated cable) for direct connection and Ethernet (registered trademark), but also a communications network, such as a telephone network, a cable network and the Internet. As a communication method, both wired and wireless communications are allowable.

The input pad 40 is used as an input device (input system), in combination with a toy 20 as a formed object that points a position in a detection area (placement detectable area) E, forming a so-called tablet. The toy 20 consists of a pedestal 20a and a figure part 20b, the pedestal 20a incorporating a tuning circuit having a coil, a capacitor, an IC chip, etc. The input pad (namely, tablet main body) 40 includes a sensor embedded therein to detect a position coordinate in the detection area E, the coordinate corresponding to a placed position of the toy 20. The input pad 40 detects the placed position of the toy 20 placed in the detection area E, utilizing electromagnetic induction occurred between the input pad 40 and the toy 20.

Specifically, the input pad 40 has a lot of loop coils arranged therein in mesh. The pad 40 selects a loop coil sequentially by a selection circuit, and alternately connects the loop coil to a sending circuit and a receiving circuit through a switching circuit. When the toy 20 is placed on the input pad 40, the coil included in the toy 20 transmits a radio wave by tuning the tuning circuit embedded in the toy 20, and a voltage is induced in the loop coil at the time of switching the sending circuit to the receiving circuit. By detecting this induced voltage by the receiving circuit, the input pad 40 determines on which loop coil the toy 20 is placed.

Figure 2:
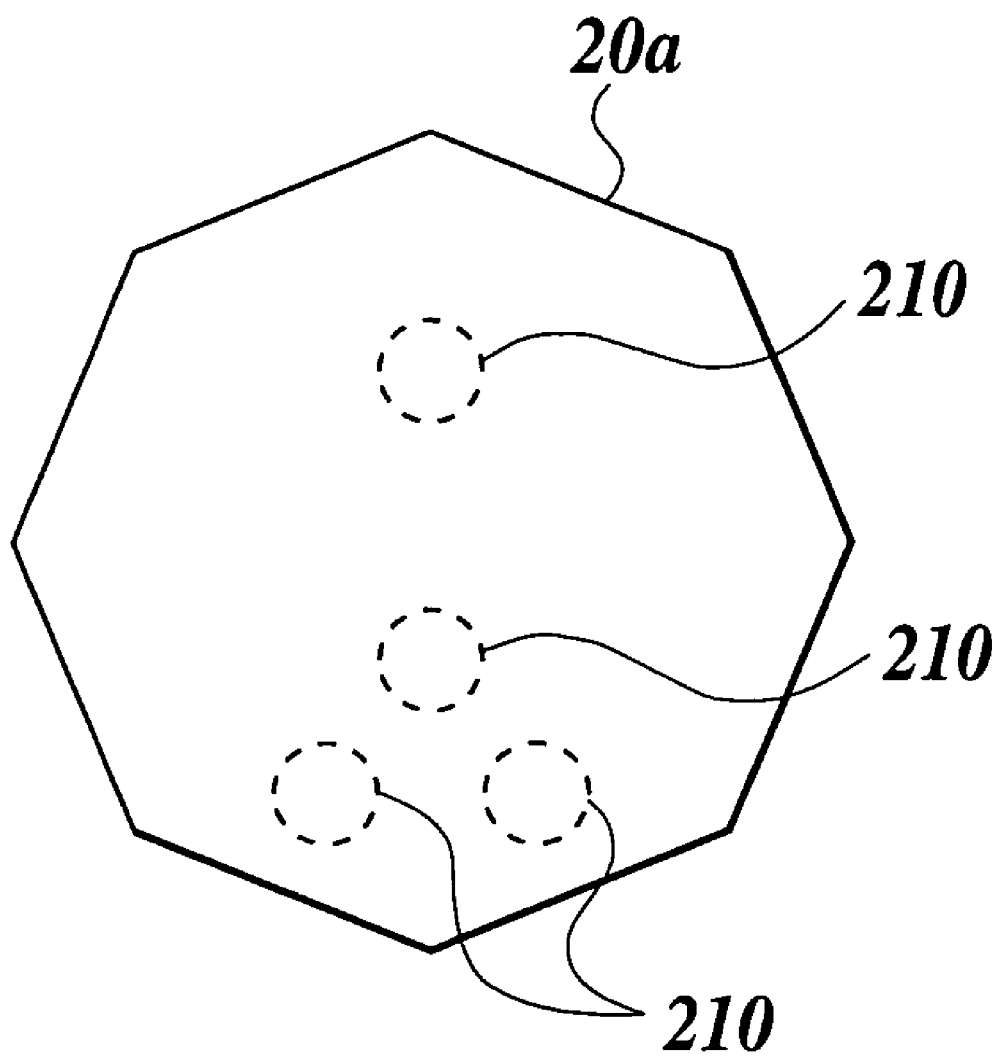
FIG. 2 is a bottom view showing one example of a pedestal provided on a toy.

Further, by detecting the loop coils at the input pad side in which the voltage is induced as described above, a direction of the toy 20 can be detected. FIG. 2 is a bottom view of the pedestal 20a provided on the toy 20. In the drawing, disposed positions of coils 210 embedded in the pedestal 20a are shown by broken lines. The direction of the toy 20 is identified by four coils 210 embedded in the pedestal 20a. That is, positional relationship of coils 210 at the toy 20 side is recognized by position coordinates group in the detection area E, which corresponds to the positions of voltage-induced loop coils, and the direction of the toy 20 can be detected based on the recognized positional relationship of coils 210. The figure part 20b of the toy 20 is mounted on the pedestal 20a so that the front side of the figure part 20b directs, for example, upward in the drawing. In the embodiment, the direction is determined depending on the positional relationship among the plurality of coils 210 embedded in the toy 20, but alternatively, the direction of the toy 20 may be determined by, for example, disposing coils having different inductance from one another.

Further, the input pad 40 performs data communication with the toy 20. Specifically, responding to a radio wave sent from the input pad 40, the toy 20 generates an identification signal, and sends it to the input pad 40, then the input pad 40 identifies the toy 20 placed thereon based on the received identification signal.

A player operates the game controller 3 and the toy 20 on the input pad 40, viewing a game screen displayed on the display 2, to enjoy the game. To be concrete, the player operates the controller 3 according to game-story progress to progress the game, and when the player encounters an enemy character during the game progress and moves into a fighting mode, the player places a toy 20 on the input pad 40 and operates the toy 20 on the input pad 40.

To be more concrete, in the fighting mode, when the toy 20 is placed on the detection area E of the input pad 40, the game apparatus identifies the placed toy 20, and makes a character imitating the figure of the placed toy 20 (hereinafter referred to as "toy character") appear on a fighting screen as an operational object character of the player (hereinafter, simply "operational object character"), then, according to operations of changing the placed position and the direction of the toy 20, operates the corresponding operational-object character. As toys 20 to be placed on the input pad 40, various figures of toys 20 are prepared, for example, a "dinosaur" figured toy, a "human" figured toy, a "cat" figured toy, and the like. A description will be given below assuming that a piece of toy 20 (hereinafter, properly "operational toy 20") is placed on the detection area E of the input pad 40 when the game moves into a fighting mode, and a toy character imitating the toy 20 appears on a fighting screen as an operational-object character.

Figure 3A:
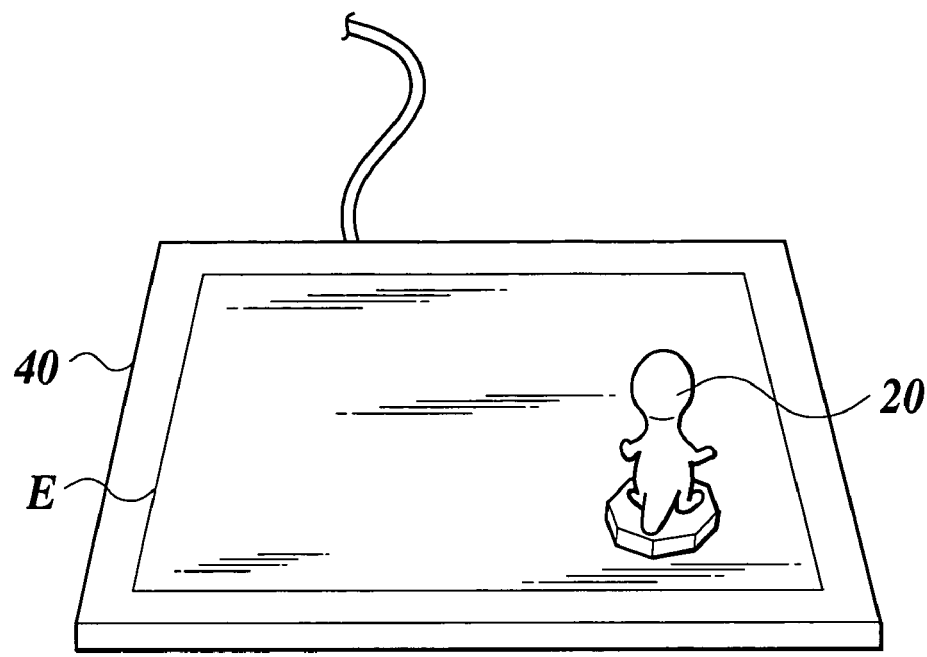
FIG. 3A illustrates one example of a placement state of the toy on an input pad.

FIG. 3A shows one example of a placement state of an operational toy 20 on the input pad 40. Within the detection area E on the input pad 40 shown in FIG. 3A, a "dinosaur" figured operational toy 20 is placed.

Figure 3B:
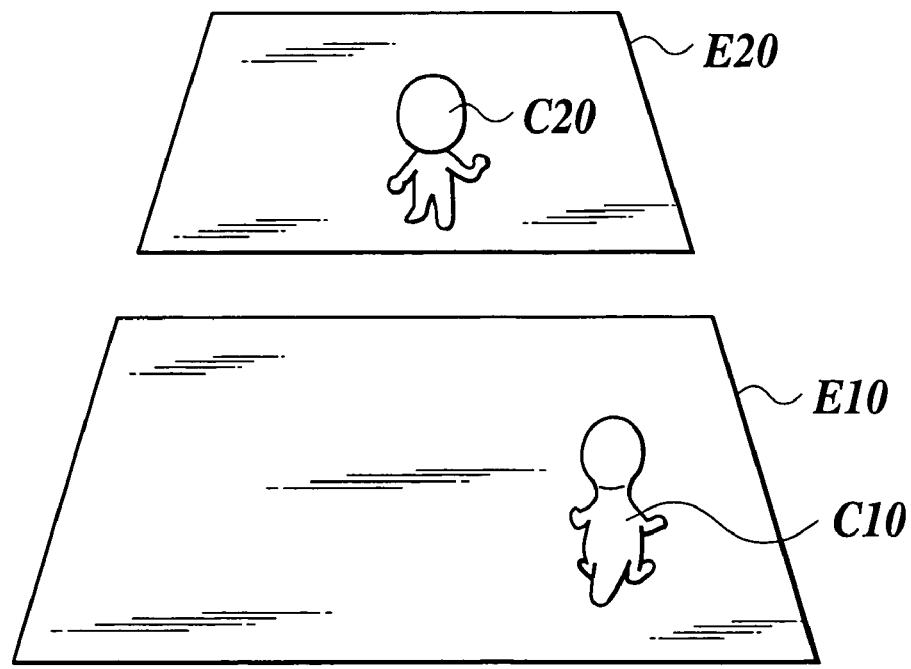
FIG. 3B illustrates one example of a fighting area.

FIG. 3B illustrates one example of a fighting area set in a game space. The fighting area includes an own fighting area E10 that is set corresponding to the detection area E of the pad 40, and an enemy fighting area E20. As shown in FIG. 3B, in the own fighting area E10, the "dinosaur" figured toy character C10 is disposed as an operational-object character at the position corresponding to the placed position of the operational toy 20 shown in FIG. 3A. In the enemy fighting area E20, an enemy character C20 is disposed at an arbitrary position. When the game has proceeded to the fighting mode, the player places a piece of toy 20 out of toys 20 having on hand onto a desired position on the detection area E, so that the operational-object character appears in the fighting area.

[Principle]

In the embodiment, when the game proceeds into the fighting mode, the operational-object character is controlled in its operation and movement according to various operational inputs, such as a move operation and a turn operation with changing the placed position and the direction of the operational toy 20 placed on the input pad 40, and a double-tap operation with two times of continuous tapping of the operational toy 20.

(1) Move Operation of Placed Position

When the operational toy 20 is slid to move on the input pad 40, the operational-object character is moved, for example.

Figure 4A:
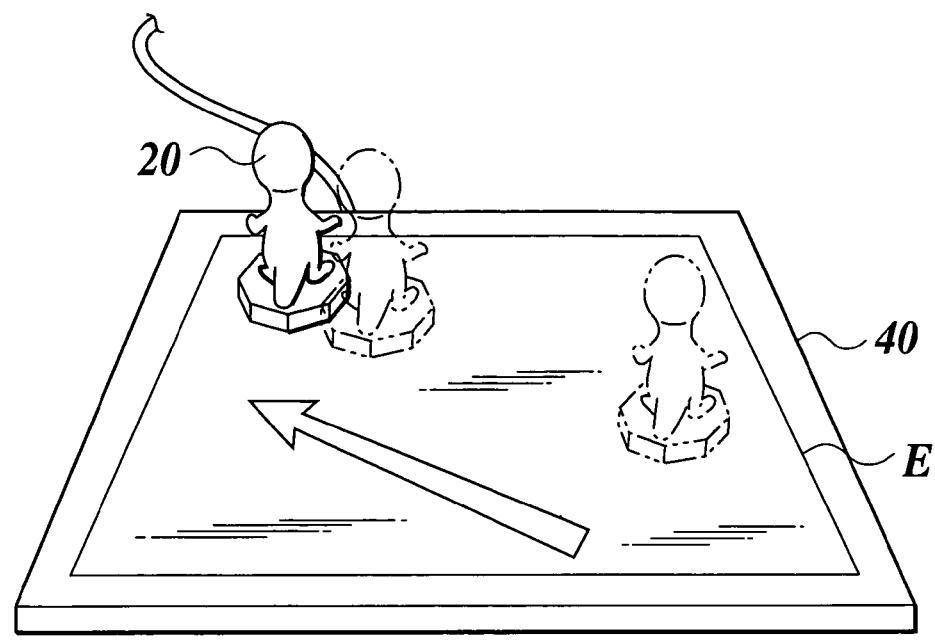
FIG. 4A shows one example of movement of an operational-object character according to the move operation with respect to a placed position of the toy on the input pad.
Figure 4B:
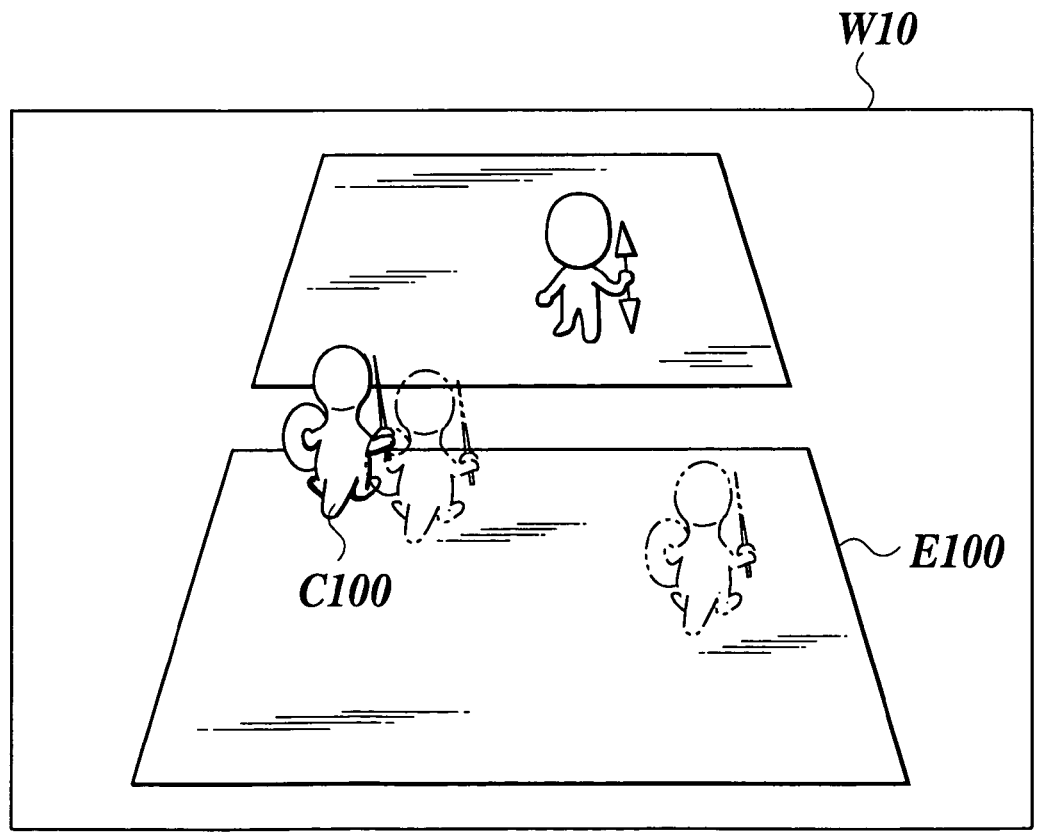
FIG. 4B shows one example of movement of an operational-object character according to the move operation with respect to a placed position of the toy on the input pad.

FIGS. 4A and 4B illustrate movement of the operational-object character according to the move operation of the placed position of the operational toy 20 on the input pad 40. FIG. 4A shows change of a placement state of the operational toy 20 in the detection area E of the input pad 40, and FIG. 4B shows one example of a fighting screen W10 displayed according to the change of a placement state of the operational toy 20 shown in FIG. 4A. That is, as a placed position of the operational toy 20 is moved on the input pad 40 as shown in FIG. 4A, the operational-object character C100, as shown in FIG. 4B, moves in the own fighting area E100 following a moving path of the operational toy 20 on the input pad 40. Here, if the operational toy 20 is simply changed its placed position without sliding to move the operational toy 20 on the input pad 40, the operational-object character may be operated to move to a corresponding position in the game space.

(2) Turn Operation

When the operational toy 20 is turned on the input pad 40, the operational-object character performs attack motion corresponding to a turning direction, for example.

Figure 5A:
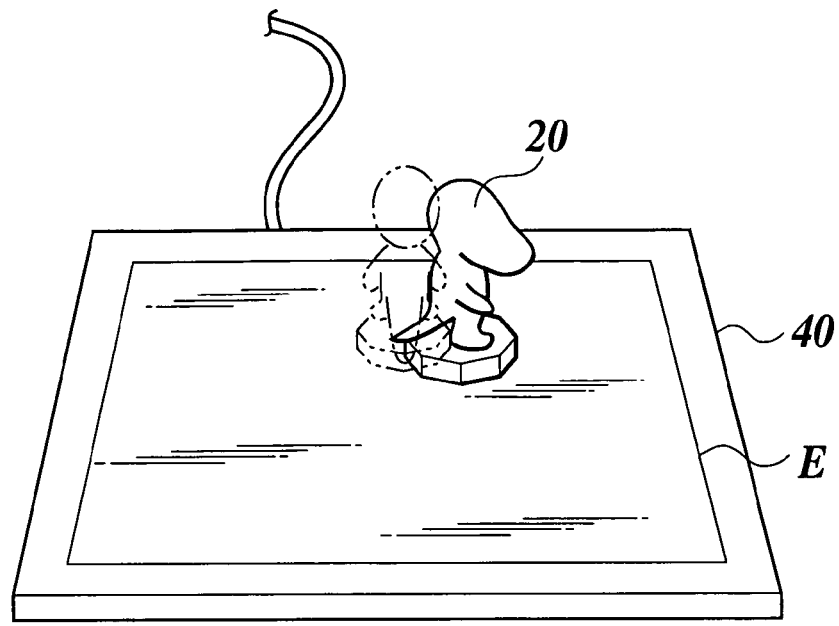
FIG. 5A shows one example of movement of the operational-object character according to a right-turn operation of the toy on the input pad.
Figure 5B:
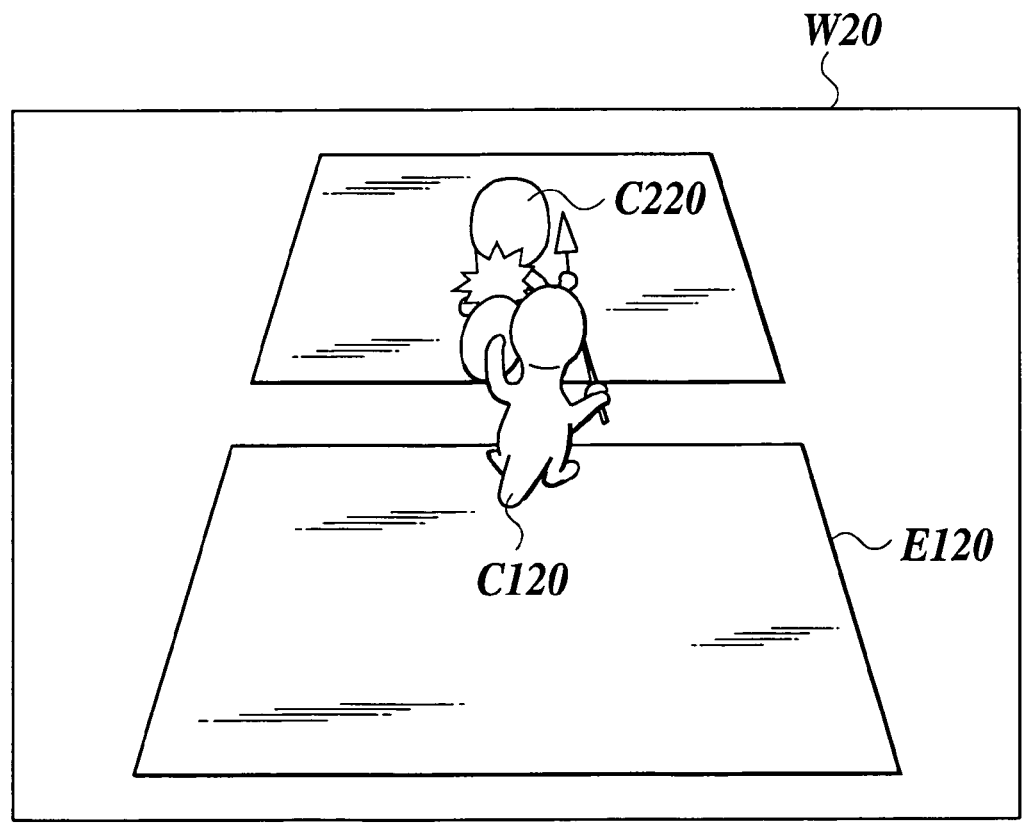
FIG. 5B shows one example of movement of the operational-object character according to the right-turn operation of the toy on the input pad.

FIGS. 5A and 5B illustrate motion of the operational-object character corresponding to the right-turn operation of the operational toy 20 on the input pad 40. FIG. 5A shows change of a placement state of the operational toy 20 in the detection area E of the input pad 40, and FIG. 5B shows one example of a fighting screen W20 displayed according to the change of a placement state of the operational toy 20 shown in FIG. 5A. That is, when the operational toy 20 placed on the input pad 40 is turned right at the placed position as shown in FIG. 5A, an operational-object character C120 in an own fighting area E120, as shown in FIG. 5B, performs attack motion against an enemy character C220 using a "shield" held in its left hand.

Figure 6A:
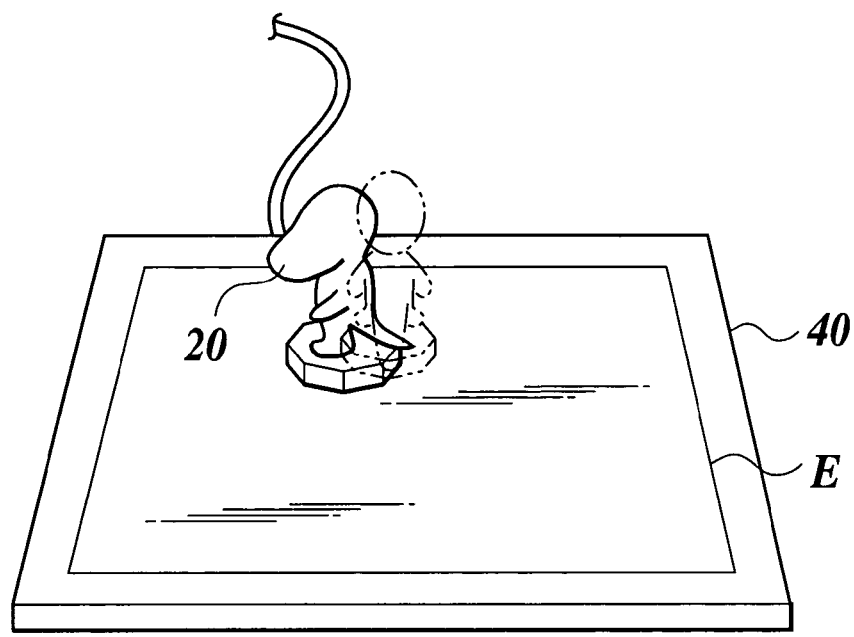
FIG. 6A shows one example of movement of the operational-object character according to a left-turn operation of the toy on the input pad.
Figure 6B:
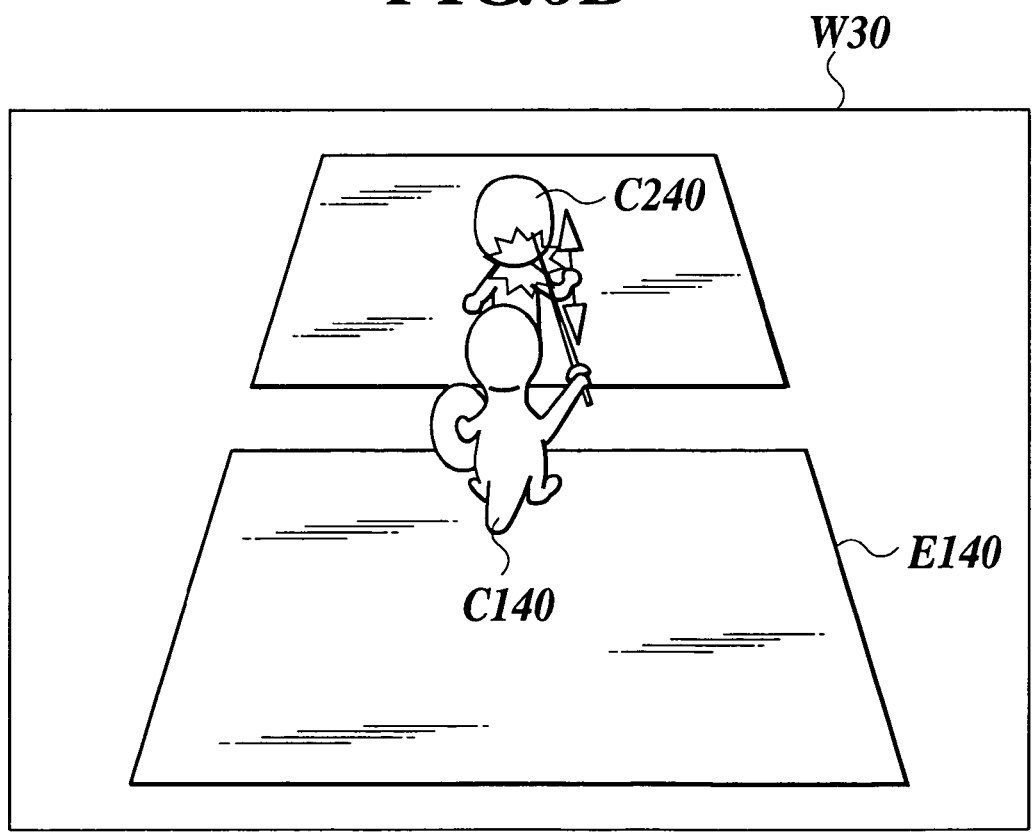
FIG. 6B shows one example of movement of the operational-object character according to the left-turn operation of the toy on the input pad.

FIGS. 6A and 6B illustrate motion of the operational-object character corresponding to the left-turn operation of the operational toy 20 on the input pad 40. FIG. 6A shows change of a placement state of the operational toy 20 in the detection area E of the input pad 40, and FIG. 6B shows one example of a fighting screen W30 displayed according to the change of a placement state of the operational toy 20 shown in FIG. 6A. That is, when the operational toy 20 placed on the input pad 40 is turned left at the placed position as shown in FIG. 6A, an operational-object character C140 in an own fighting area E140, as shown in FIG. 6B, performs attack motion against an enemy character C240 using a "sword" held in its right hand.

(3) High-Speed Move

When the operational toy 20 is moved in high speed on the input pad 40, the operational-object character performs attack motion according to a distance from an enemy character, for example.

Figure 7A:
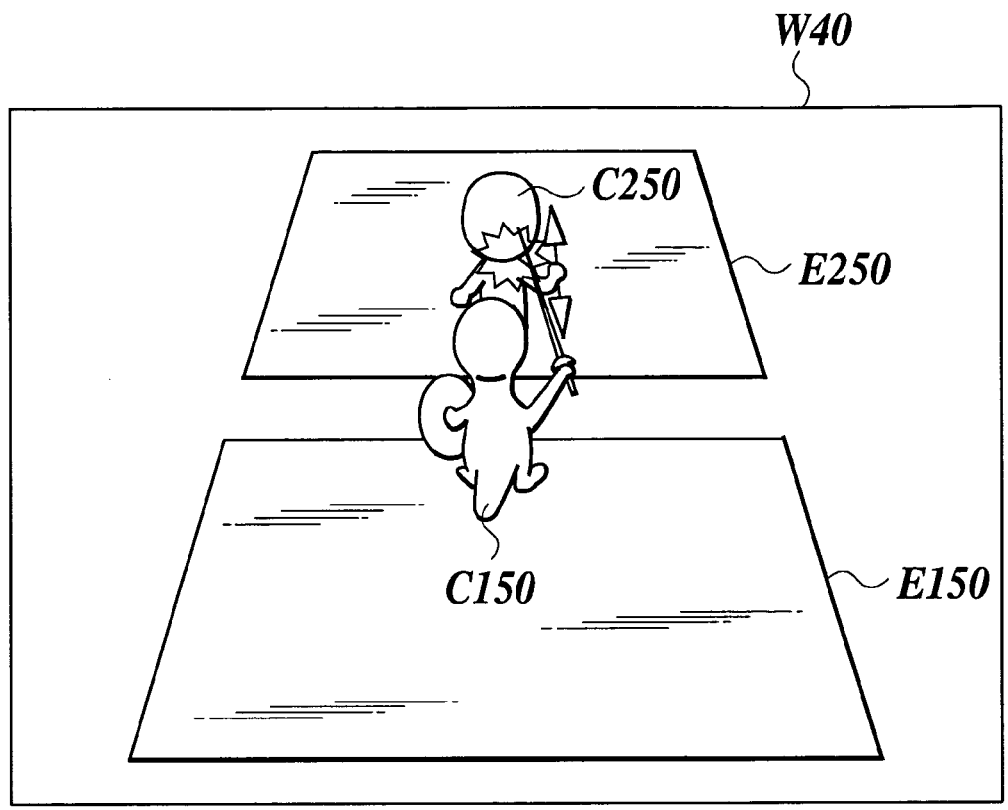
FIG. 7A shows one example of movement of the operational-object character according to a high-speed move operation of the toy on the input pad.
Figure 7B:
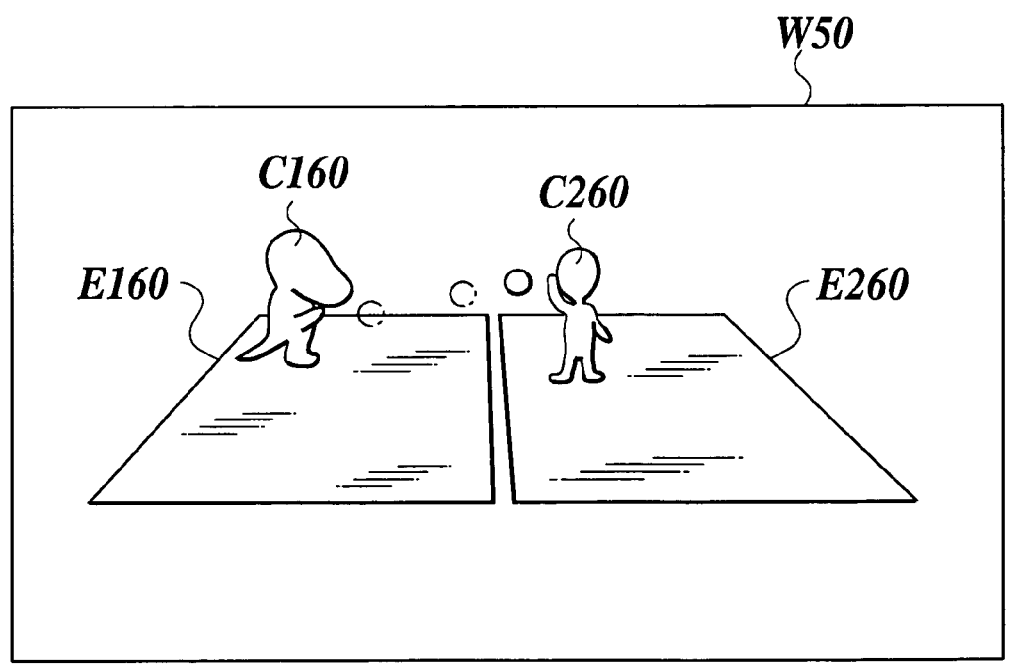
FIG. 7B shows one example of movement of the operational-object character according to a high-speed move operation of the toy on the input pad.

FIGS. 7A and 7B illustrate motion of the operational-object character corresponding to the high-speed move operation of the operational toy 20 on the input pad 40. Specifically, FIG. 7A shows one example of a fighting screen W40 displayed in case that a distance between an operational-object character C150 in an own fighting area E150 and an enemy character C250 in an enemy fighting area E250 is less than a predetermined threshold value. That is, the operational-object character C150, as shown in FIG. 7A, performs direct attack motion against the enemy character C250, using a weapon "sword" held in its right hand, corresponding to the high-speed move operation of the operational toy 20 on the input pad 40. FIG. 7B shows a fighting screen W50 displayed in case that the distance is larger than the threshold value, that is, corresponding to the high-speed move operation of the operational toy 20, the operational-object character C160 in an own fighting area E160 performs remote attack motion against an enemy character C260 in an enemy fighting area E260, using a weapon "stone".

(4) Double Taps

Corresponding to double taps of the operational toy 20 on the input pad 40, the operational-object character performs attack operation with a special magic. Specifically, corresponding to the double taps of the operational toy 20, for example, a summoned character appears at a given position in the fighting area, and performs attack motion against enemy characters.

Figure 8:
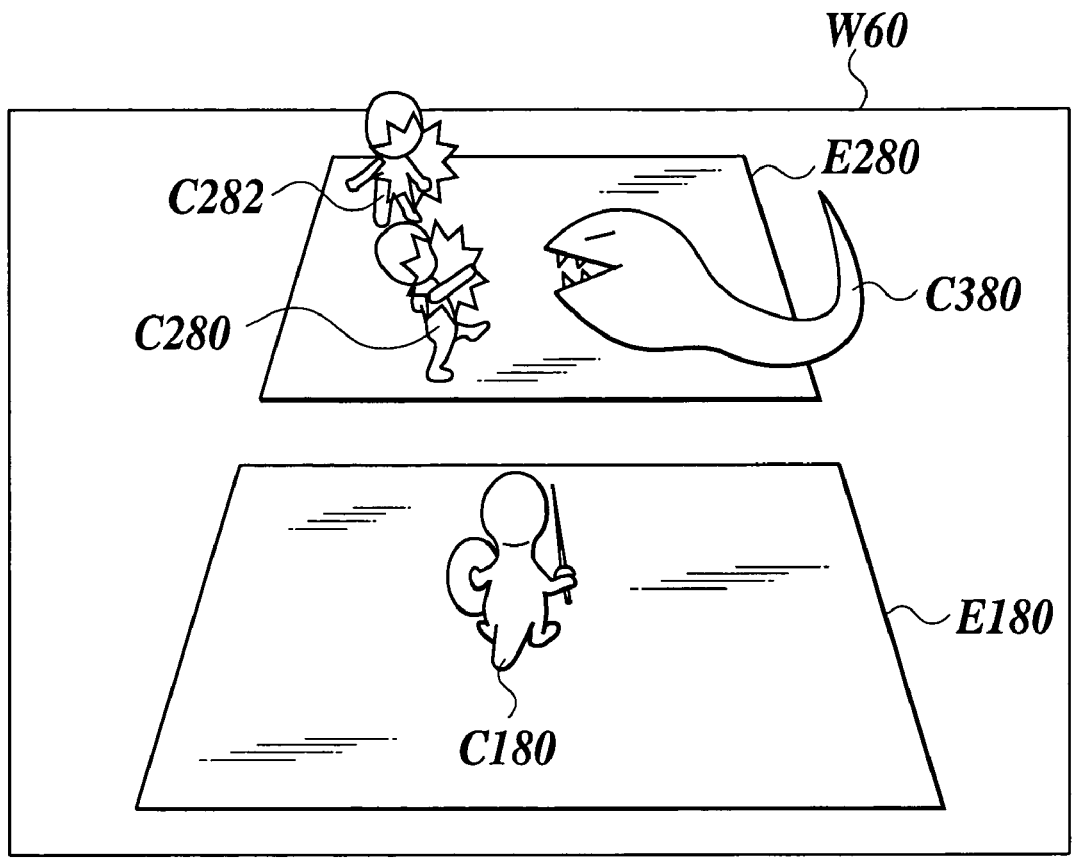
FIG. 8 shows one of a fighting screen displayed according to double taps of the toy on the input pad.

FIG. 8 shows one example of a fighting screen W60 displayed according to double taps of the operational toy 20 on the input pad 40. As shown in the drawing, an operational-object character C180 is displayed in an own fighting area E180, and enemy characters C280 and C282 in an enemy fighting area E280. In the enemy fighting area E280, a summoned character C380 is displayed, and the character C380 performs attack motion against the enemy characters C280 and C282.

[Functional Structure]

Figure 9A:
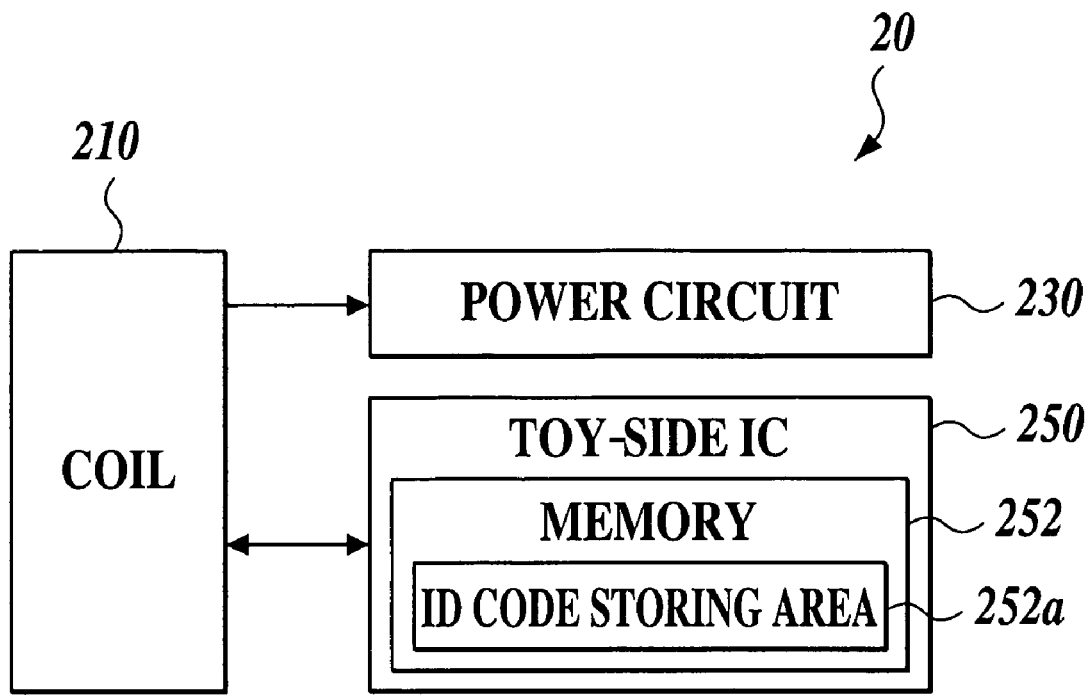
FIG. 9A is a block diagram showing one example of an internal configuration of the toy

FIG. 9A is a block diagram showing one example of the internal structure of a toy 20. The toy 20 includes a coil 210, a power circuit 230 and a toy-side IC 250. The IC 250 has a memory 252 consisting of a RAM, a ROM, and the like. The coil 210 is provided for communicating with an antenna coil 42 (see FIG. 10) in the input pad 40, which will be explained later, based on electromagnetic induction, and structured by a wire-wound coil or the like. The power circuit 230 rectifies current induced in the coil 210 to supply a predetermined voltage to the IC 250, including a capacitor and the like. The toy-side IC 250 is automatically powered by the voltage supplied from the power circuit 230, and functions as a controller for outputting information stored in the memory 252 to the input pad 40 through the coil 210. Specifically, the IC 250 transmits, to the input pad 40 through the coil 210, an ID code stored in an ID code storing area 252a.

Figure 9B:
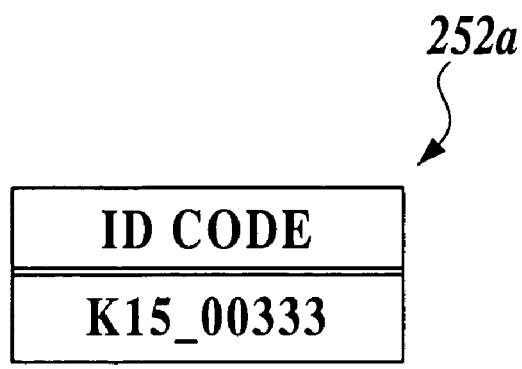
FIG. 9B is a diagram showing one example of an ID code.

The ID code is information for identifying a toy 20, the information having in combination a model code for indicating a toy model of the toy 20 and an identification code for identifying the toy 20. FIG. 9B shows one example of the ID code stored in the ID code storing area 252a. In an ID code "K15_00333" shown in FIG. 9B, the former part "K15" indicates a model code of the toy 20, and the latter part "00333" an identification code. Here, the toy model means a kind of toy 20 classified according to figures of toys 20, so that the model code can identify the toy model of the toy 20. The identification code is information, such as a serial number of a toy 20, for example, particularly allotted to the toy 20. With this ID code, the toy 20 is uniquely identified.

Figure 10:
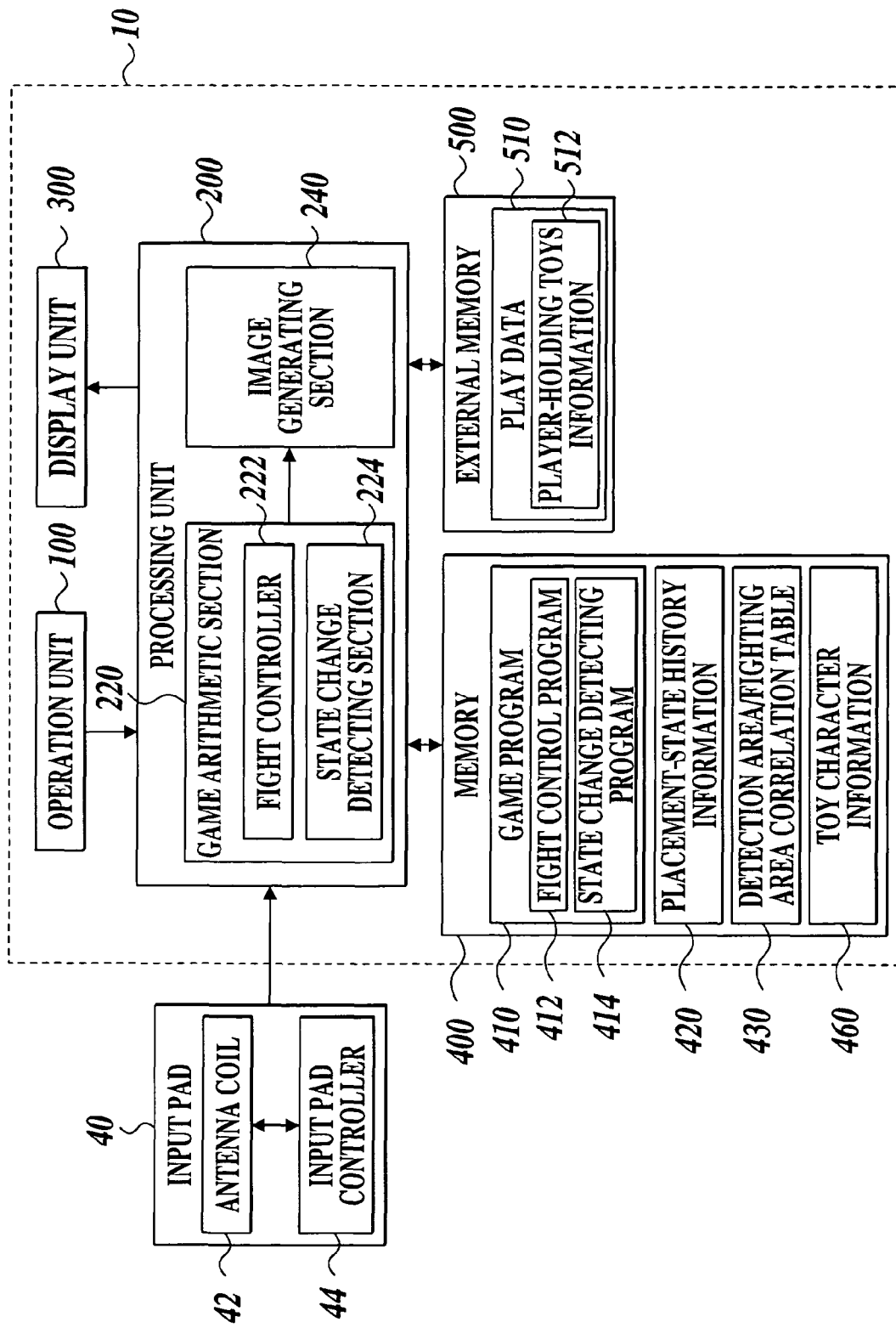
FIG. 10 is a block diagram showing an internal configuration of the game apparatus and the input pad connected to the game apparatus.

FIG. 10 is a block diagram showing one example of internal configuration of the game apparatus 10 and the input pad 40 connected thereto.

The input pad 40 includes an antenna coil 42 as a coil part, and an input pad controller 44. The input pad controller 44 controls current flow and voltage in the antenna coil 42 to be changed so as to detect position coordinates group on the detection area corresponding to the coil positions of the placed toy 20, as well as performs data communication with the toy 20 and receives the ID code through the antenna coil 42. Then the input pad controller 44 generates placement state information in which the received ID code of the toy 20 is made associated with the detected position coordinates group, and outputs it to a processing unit 200 of the game apparatus 10.

There is executed by the input pad controller 44 as described above the processing for detecting the placed position of the toy 20 and for receiving the ID code stored in the toy 20, for example, at predetermined time intervals, and the placement state information output to the processing unit 200 is stored and held in placement-state history information 420 in the game apparatus 10, which will be described later.

The game apparatus 10 includes an operation unit 100, a processing unit 200, a display unit 300, a memory 400, and an external memory 500.

The operation unit 100 is provided so that the player operating the game apparatus 10 can input game-related various operations, such as movement of the operational-object character. This unit 100 corresponds to the game controller 3 shown in FIG. 1. Operation signals input from the operation unit 100 are output to the processing unit 200.

The processing unit 200, based on programs and data stored in the memory 400, performs control of entire game apparatus 10, instruction to each functional part of the game apparatus 10, and various processing such as image processing and voice processing. These functions of the processing unit 200 are implemented with given programs and hardware, such as various processors (CPU, DSP, or the like), ASICs (gate-array or the like), and the like.

When the placement state information is input from the input pad 40, the processing unit 200 updates the placement-state history information 420. The placement-state history information 420 stores the placement state information input from the input pad 40, and when the placement state information is newly input from the input pad 40, the input placement state information is written in addition by the processing unit 200.

Figure 11:
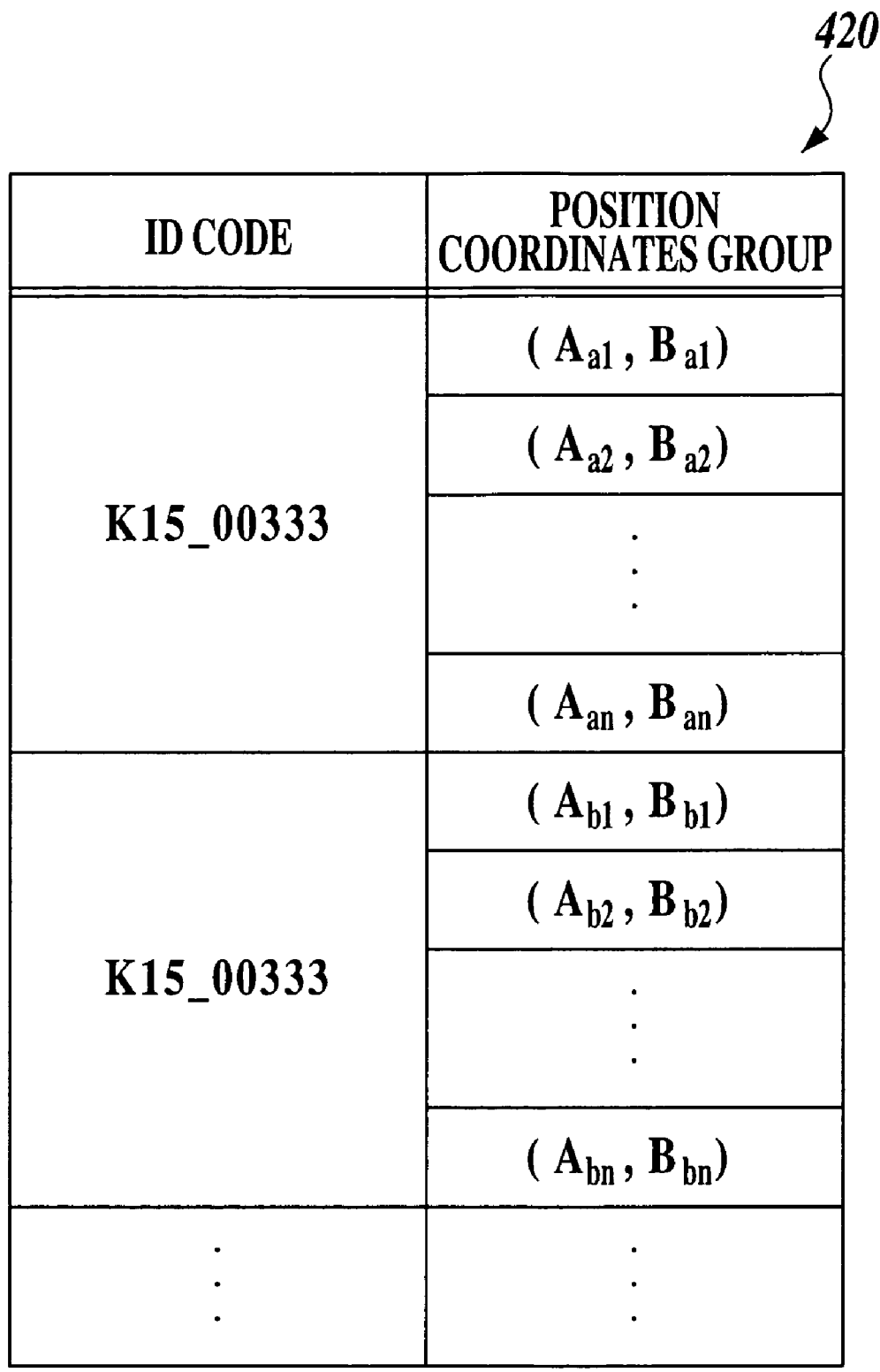
FIG. 11 is a diagram showing one example of placement-state history information.

FIG. 11 shows one example of the placement-state history information 420. As shown in the drawing, the placement-state history information 420 stores the ID code of a toy 20, and the placement state information associated with the position coordinates group in the detection area corresponding to the coil positions of the toy 20. A state change detecting section 224, to be explained later, recognizes relationship of disposed positions of the coils based on the position-coordinates group.

The processing unit 200 includes a game arithmetic section 220 and an image generating section 240 as main functional sections.

The game arithmetic section 220 executes various games processing according to operation signals input from the operation unit 100 and game programs 410 stored in the memory 400, and outputs processing results to the image generating section 240. The games processing includes setting process for a game space; disposition process of the object in the game space; calculating process relating to the position and direction, moving speed, advancing direction for a character, etc.; determination process for a viewpoint and a view direction of a virtual camera; and game progressing process such as story development.

The image generating section 240 generates a game image for each frame based on the calculated results by the game arithmetic section 220, and outputs image signals of the generated image to the display unit 300.

The game arithmetic section 220 includes functional sections called a fight controller 222 and a state change detecting section 224. The fight controller 222 executes a fight control process according to a fight control program 412 when the game has proceeded to a fighting mode, and the state change detecting section 224 executes a state change detecting process according to a state change detecting program 414.

Figure 12:
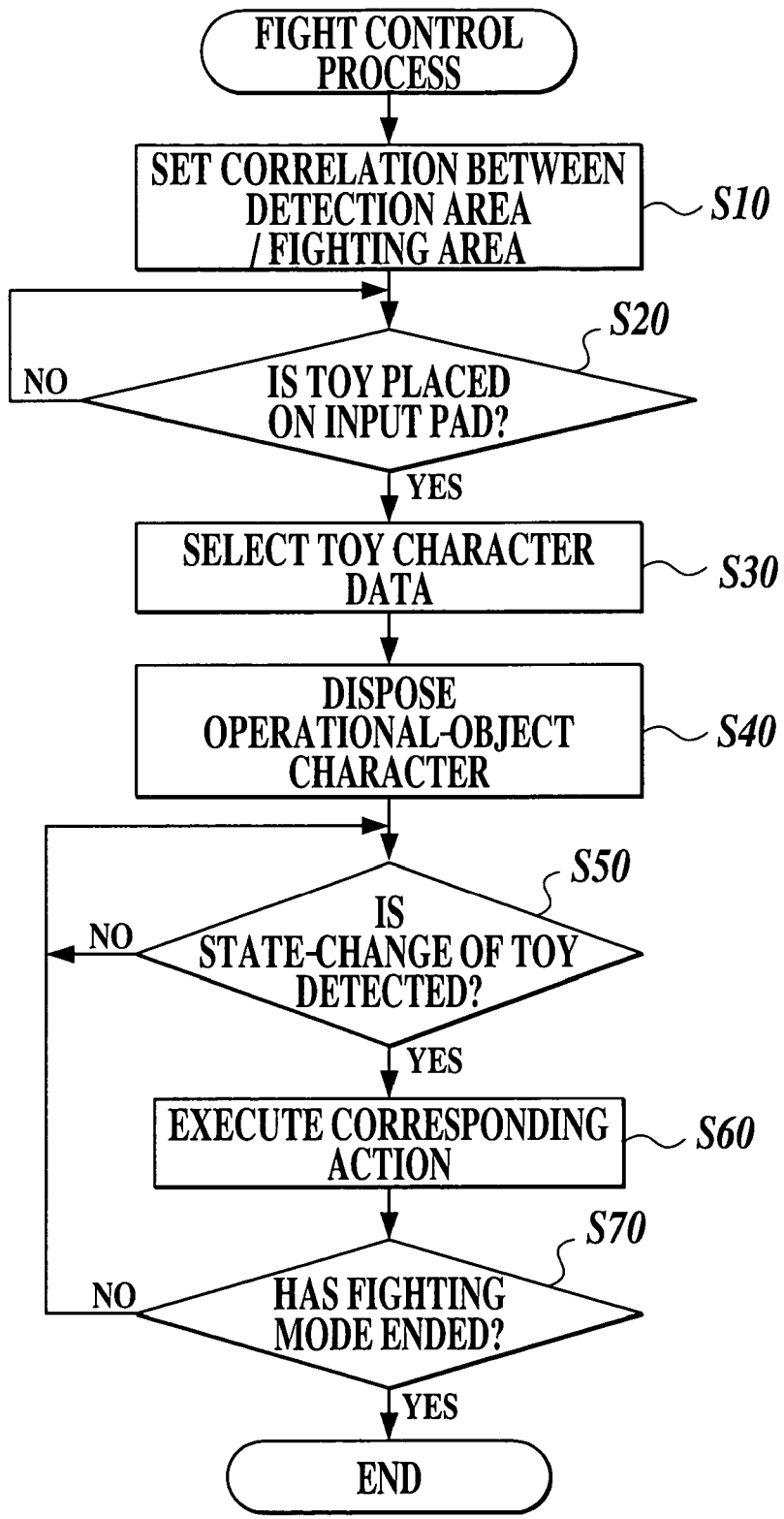
FIG. 12 is a flowchart showing operation of a fight controller according to execution of a fight control process.

FIG. 12 shows an operation flowchart of the fight controller 222 according to the fight control process implemented by execution of the fight control program 412. As shown in the drawing, the fight controller 222 first sets correlation between the detection area of the input pad 40 and the fighting area in the game space, and generates a detection area/fighting area correlation table 430 (step S10).

FIG. 13 shows one example of the detection area/fighting area correlation table 430. As shown in the diagram, the detection area/fighting area correlation table 430 stores coordinates of four corners of the detection area on the input pad 40, and coordinates of four corners of the fighting area set in the game space, respectively correlated with each other. The fight controller 222 calculates a position in the fighting area corresponding to a position in the detection area, using the correlation between the detection area and the fighting area based on the detection area/fighting area correlation table 430.

Then, the fight controller 222 waits for placement operation of a toy 20 (step S20). Specifically, when new placement state information is input from the input pad 40 and the placement-state history information 420 is updated by the processing unit 200, the fight controller 222 determines that a toy 20 has been placed, the toy 20 having an ID code allotted thereto included in the new placement state information.

If the toy 20 is placed on the input pad 40 (step S20: YES), the fight controller 222 executes the following process based on the placement state information newly added to the placement-state history information 420 (hereinafter, "objective placement state information"). That is, the fight controller 222 first reads the ID code from the objective placement state information, and selects corresponding toy-character data from toy character information 460 (step S30).

FIG. 14 shows one example of the toy character information 460. As shown in the diagram, there are stored in the toy character information 460 for each model code, toy-character name representing the corresponding toy 20, toy-character figure presenting the toy 20, character data of the toy character, and action data of the toy character (to be explained later in detail).

There is stored in the character data various information, such as parameter information on the corresponding toy character, image information on the toy character, motion pattern information for motion control, and the like. The parameter indicates the information uniquely defined for each toy character, including initial values for various capacity values, such as level, HP, attack power, quickness and recovering power, possessing items or available magic, and the like.

Next, the fight controller 222 disposes a toy character, representing the placed toy 20, in the own fighting area as an operational-object character (step S40). Specifically, the fight controller 222 reads the position coordinates group from the objective placement state information, and calculates, based on the detection area/fighting area correlation table 430, the position in the own fighting area corresponding to the placed position of the toy 20, and also decides the direction of the toy character to be disposed. Then, based on the toy character data selected at step S30, the fight controller 222 disposes the selected toy character at the calculated position in the own fighting area with the decided direction.

After disposing the operational-object character in the own fighting area, the fight controller 222 disposes an enemy character in an enemy fighting area, and controls the motions of the operational-object character to execute a fighting process against the enemy character. To be concrete, based on a state change of the toy 20 detected by the state change detecting section 224, the fight controller 222 executes processing for disposing the operational-object character, and processing for controlling fighting motions of the operational-object character, and then outputs the processing result to the image generation section 240.

The operation of the state change detecting section 224 will be explained. The state change detecting section 224 detects a state change of the toy 20 on the input pad 40, based on the placement state information input from the input pad 40 at appropriate timing, and sends the detected state change information to the fight controller 222.

Specifically, when the processing unit 200 updates the placement state history information 420, the state change detecting section 224 recognizes disposed positional relation among coils of the toy 20 side, based on newly added placement state information, to detect the direction of the toy 20. If the state change detecting section 224 determines, by comparing with the previously input placement state information, that the direction of the toy 20 only has been changed, the detecting section 224 determines that the turn operation of the toy 20 has been input, and outputs the state change information "turn operation" to the fight controller 222. If the state change detecting section 224 determines, by comparing with the previously input placement state information, that the placed position has been changed, and an elapse time, from the beginning of movement to the end of placed-position transit operation of the toy 20, is less than a predetermined threshold value with larger positional change than a predetermined distance, the detecting section 224 determines that the high-speed move operation of the toy 20 has been input, and outputs the state change information "high-speed move" to the fight controller 222. If the elapse time up to the end of placed-position transit operation of the toy 20 is more than the threshold value, the detecting section 224 determines that the move operation of the toy 20 has been input, and outputs the state change information "move" to the fight controller 222. Further, if double-tap operation of the toy 20 has been detected, the detecting section 224 outputs the state change information "double taps" to the fight controller 222.

When the state change information is input from the state change detecting section 224, the fight controller 222 determines that state change of the toy 20 has been detected. As shown in FIG. 12, if the fight controller 222 detects the state change of the toy 20 (step S50: YES), the controller 222 refers to the toy character information 460, reads out the corresponding action pattern based on the state change information from the action data associated with the ID code of the toy 20, and executes the action (step S60).

FIG. 15 shows one example of action data. The action data is information defined particularly to each toy model in the toy character information 460, and has state change items of the toy 20, and corresponding action patterns, which are stored therein. The action data shown in FIG. 15 is one example of that for Gigarock, which corresponds to record L10 in FIG. 14.

According to the action data shown in FIG. 15, if the state change information "move" is input from the state change detecting section 224, for example, the fight controller 222, according to an action pattern shown in record L20, changes a disposed position of the operational-object character in the own fighting area to a position corresponding to the present placed position of the operational toy 20. That is, the fight controller 222 first refers to the placement state history information 420 to read a position coordinates group of the toy 20 from the latest placement state information. Then, according to the detection area/fighting area correlation table 430, the fight controller 222 calculates the position in the own fighting area corresponding to the placed position of the toy 20, and also decides the direction of the toy character to be disposed. Next, according to the toy character data selected at step S30, the fight controller 222 disposes the corresponding toy character at the calculated position in the own fighting area with the decided direction.

If the state change information "right turn" is input from the state change detecting section 224, the fight controller 222 controls the motion of the operational-object character according to an action pattern shown in record L22 to have the operational-object character perform attack motion using the weapon "shield" held in its left hand.

If the state change information "left turn" is input from the state change detecting section 224, the fight controller 222 controls the motion of the operational-object character according to an action pattern shown in record L24 to have the operational-object character perform attack motion using the weapon "sword" held in its right hand.

If the state change information "high-speed move" is input from the state change detecting section 224, the fight controller 222 controls the motion of the operational-object character according to an action pattern shown in record L26. That is, the fight controller 222 obtains a distance between the operational-object character and the enemy character in the fighting area, and if the distance is less than a threshold value V, the controller 222 controls the motion of the operational-object character so as to perform direct attack motion using the weapon "sword" held in its right hand. And if the distance between the operational-object character and the enemy character in the fighting area is not less than the threshold value V, the controller 222 controls the motion of the operational-object character so as to perform remote attack motion using the weapon "stone".

If the state change information "double taps" is input from the state change detecting section 224, the fight controller 222 disposes a summoned character at a given position in the fighting area according to an action pattern shown in record L28, and controls the motion of the summoned character so as to perform predetermined attack motion.

The fight controller 222 returns the process to step S50 to watch detection of the state change until the fighting mode ends, and if the fighting mode ends (step S70: YES), then the present process ends.

Meanwhile, parameter values of the operational-object character are defined in the toy character information 460 as described before with initial parameter values of the corresponding toy character, and change according to fighting history and the like. The changed parameter values are stored in player-holding toys information 512 by the fight controller 222.

FIG. 16 shows one example of player-holding toys information 512. As shown in the diagram, there are stored in the player-holding toys information 512 ID codes, corresponding toy character names and parameter information associated with one another. The fight controller 222 updates the parameter information of the operational-object character at predetermined timing during the game, such as the end of fighting mode, and updates the player-holding toys information 512 based on the ID code of the operational toy 20 corresponding to the operational-object character. The fight controller 222 reads out the parameter information of the operational-object character in the fighting mode from the player-holding toys information 512. Further, when a newly prepared toy 20 which a player obtained or the like is placed on the input pad 40, that is, when a record, including an ID code that matches an ID code input from the pad 40, is not found in the player-holding toys information 512, the fight controller 222 stores in the player-holding toys information 512 the ID code and a record including the corresponding toy character name and parameter information, which are generated to be stored in the toy character information 460.

The display unit 300 corresponds to the display 2 shown in FIG. 1, and displays a game image (for example, the fighting screen W10 shown in FIG. 4B) input from the image generating section 240. The player operates the toy 20 watching the game image displayed on the display unit 300 to move the operational-object character and enjoys the game.

The memory 400 stores various processing programs and data, particularly includes game program 410, placement-state history information 420, detection area/fighting area correlation table 430, and toy character information 460, and the game program 410 has a fight control program 412 and a state change detecting program 414.

In the external memory 500, various data are stored by the processing unit 200, and play data 510 including player-holding toys information are stored. This external memory 500 corresponds to the information storage medium 6 shown in FIG. 1, such as a memory card and an IC card removably mounted on the game apparatus 10.

[Hardware Configuration]

Figure 17:
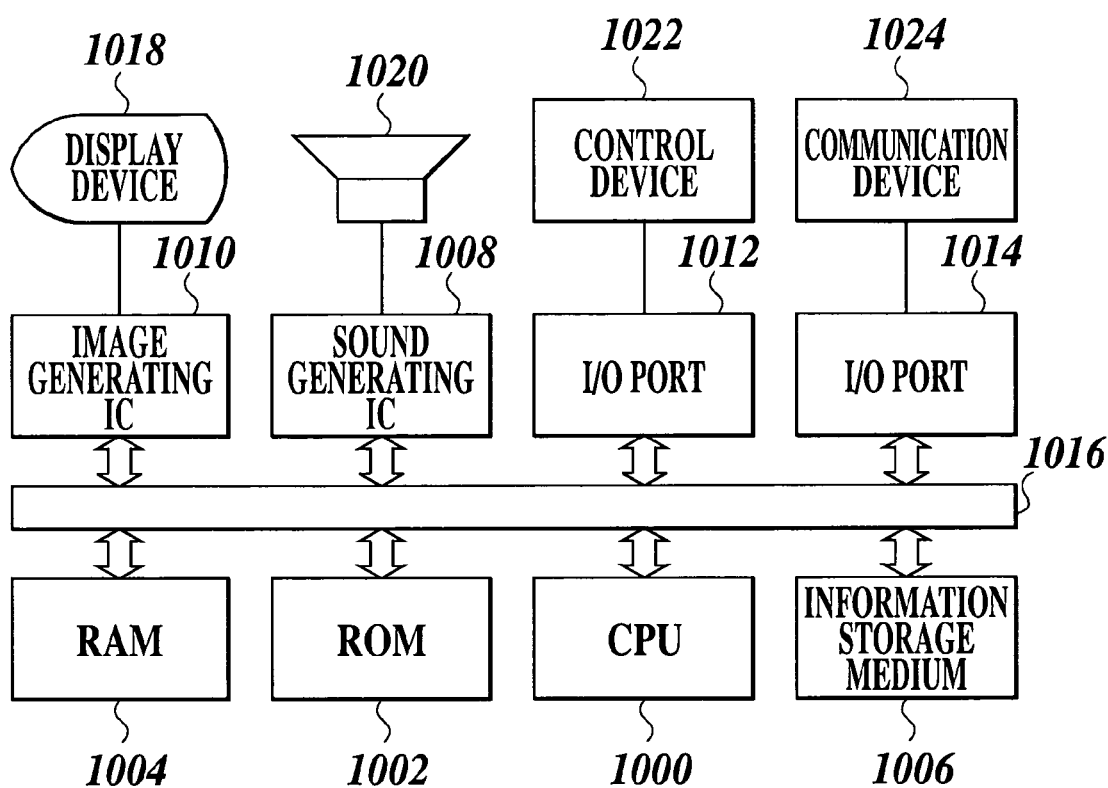
FIG. 17 is a diagram showing one example of a hardware configuration of the game apparatus.

A description will be given of one example of hardware configuration for implementing the game apparatus 10 according to the embodiment with reference to FIG. 17. The apparatus shown in FIG. 17 includes CPU 1000, ROM 1002, RAM 1004, information storage medium 1006, image generating IC 1010, sound generating IC 1008, I/O port 1012 and 1014, these parts being connected to one another via system bus 1016 capable of inputting and outputting data. The I/O port 1012 is connected to a control device 1022, and the I/O port 1014 to a communication device 1024.

The CPU 1000 executes entire control of the apparatus and various data processing, according to programs stored in the information storage medium 1006, system programs (information for initializing the host device, etc.) stored in the ROM 1002, and signals input from the control device 1022.

The RAM 1004 is a memory used as a work area and the like of the CPU, and stores given contents in the information storage medium 1006 and the ROM 1002, and calculated results of the CPU.

The information storage medium 1006 mainly stores programs, image data, play data, etc. As the medium, memory such as ROM, hard disk, game cassette, IC card, magnetic disk, optical disk, or the like are used. Functions of this information storage medium 1006 correspond to those of the memory 400 shown in FIG. 10.

The image generating IC 1010 and the sound generating IC 1008 provided in the apparatus output appropriate images and sounds, respectively.

The image generating IC 1010 is an integrated circuit for generating pixels information according to instructions from the CPU based on the information sent from ROM 1002, RAM 1004, information storage medium 1006, etc. The generated display signals are output to a display device 1018. The display device 1018 is implemented by CRT, LCD, TV, plasma display, projector, or the like, and corresponds to the display unit 300 shown in FIG. 10.

The sound generating IC 1008 is an integrated circuit for generating, due to the instructions from the CPU, sound signals according to the information stored in the information storage medium 1006 and the ROM 1002, and sound data stored in the RAM 1004. The generated sound signals are output by a speaker 1020.

The control device 1022 is a device through which a player performs operational input for a game, and its functions are implemented by hardware, such as a lever, buttons and a case. This control device 1022 corresponds to the operation unit 100 shown in FIG. 10.

The communication device 1024 communicates information to be used inside the apparatus with the outside, and is used for sending/receiving given information according to programs to/from other devices through a communication line connected thereto.

Processing described above, such as game proceeding process, is executed by the information storage medium 1006 storing the game programs 410 shown in FIG. 10, and CPU 1000, image generating IC 1010 and sound generating IC 1008 working according to these programs. The CPU 1000 and the image generating IC 1010 correspond to the game arithmetic section 222 shown in FIG. 10, and the image generating IC 1010 corresponds to the image generating section 240 shown in FIG. 10.

Alternatively, processing executed by the image generating IC 1010, the sound generating IC 1008, etc. may be executed by software using CPU 1000, a general-purpose DSP, or the like. In this case, the CPU 1000 corresponds to the processing unit 200 shown in FIG. 10.

As described above, according to the embodiment, the move operation, turn operation and tap operation of the toy 20 can be detected based on the placed position and the direction of the toy placed on the input pad 40. And, motions of the operational-object character disposed in the fighting area established in the game space can be controlled according to various operational inputs by the toy 20.

Further, action data are set for every toy model of the toys 20 in the toy character information 460, so that, according to the toy model of the toy 20 placed on the input pad 40, motions of the operational-object character corresponding to the same operational input for the toy 20 can be changed.

In the embodiment, the operational-object character is moved according to the move operation of the toy 20 on the input pad 40, but the following method may be adopted. That is, when move operation of the toy 20 is input, the state change detecting section 224 may stand by for a given time from the present time, and may detect a path shape drawn by the toy 20 based on the placement state information stored in the placement state history information 420 during the given time. The fight controller 222, for example, may have the operational-object character perform magic attack operation corresponding to the path shape detected by the state change detecting section 224.

FIG. 18 shows one example of action patterns corresponding to the state change item "move". As shown in the diagram, according to the moving path shapes of the toy 20, action patterns are defined for the operational-object character to perform respective different magic attacks. Specifically, in the embodiment described above, instead of the action pattern "move" in the state change item shown as record L20 of FIG. 15, action patterns shown in FIG. 18 may be set. The fight controller 222 reads and carries out the action pattern corresponding to the path shape of the toy 20 on the input pad 40, which the state change detecting section 224 has detected.

When the turn-operation of the toy 20 on the input pad 40 is input, motion of the operational-object character may be controlled according to an amount of turn of the toy 20 due to the turn operation. For example, for the action data in the toy character information 460, motions of the operational-object character according to the amount of turn of the toy 20 may be defined in advance as the action pattern corresponding to the state change item "turn". The state change detecting section 224 detects the amount of turn due to the directional deviation of the toy 20 when the turn operation of the toy 20 is input. Then, the fight controller 222 reads and carries out the action pattern corresponding to the amount of turn of the toy 20 on the input pad 40, which the state change detecting section 224 has detected.

When the move operation of the toy 20 on the input pad 40 is input, motion of the operational-object character may be controlled according to a moving speed of the toy 20 due to the move operation. For example, for the action data in the toy character information 460, motions of the operational-object character according to the moving speed of the toy 20 may be defined in advance as the action pattern corresponding to the state change item "move". The state change detecting section 224 detects the moving speed based on the placed-position deviation per unit time of the toy 20 when the move operation of the toy 20 is input. Then, the fight controller 222 reads and carries out the action pattern corresponding to the moving speed of the toy 20 on the input pad 40, which the state change detecting section 224 has detected.

Motion of the operational-object character may be controlled according to the direction of the operational-object character at attack timing. To be concrete, first, the state change detecting section 224 detects the direction of the operational object character at the attack timing. Next, if the detected operational-object character faces the enemy fighting area side, the fight controller 222 controls the motion of the operational object character to perform fighting operation against the enemy character. And, if the detected operational-object character faces the reverse side to the enemy fighting area, the fight controller 222 controls the motion of the operational-object character to perform recovery operation.

In the embodiment, the operational-object character is operated according to double taps of the operational toy 20 on the input pad 40, but the operational-object character may be operated according to the number of taps of the operational toy 20 on the input pad 40. That is, for example, for the action data in the toy character information 460, motions of the operational-object character according to the number of taps of the toy 20 may be defined in advance as the action pattern corresponding to the state change item "taps". The state change detecting section 224 outputs to the fight controller 222 the number of taps according to the tap operation of the toy 20. Then, the fight controller 222 reads and carries out the action pattern corresponding to the number of taps of the toy 20 on the input pad 40, which the state change detecting section 224 has detected.

[Modifications]

Although a preferred embodiment of the invention has been explained, the invention is not limited to the above-described embodiment, and various modifications may be made as needed without departing from the scope of the invention.

For example, when a fighting area corresponding to the detection area on the input pad 40 is set in the game space, the size of the fighting area may be variable.

Specifically, the fight controller 222 waits for placement operation of the toy 20, and, according to the ID code of the placed toy 20, reads out the parameter information of the corresponding operational-object character from the player-holding toys information. Then, the fight controller 222 decides the size of the fighting area according to the read parameter information of the operational-object character. More specifically, the fight controller 222 decides the size of the fighting area according to a level value set to the operational-object character. With this, a movable area of the operational-object character at the time of fighting can be varied according to the level of the operational object character representing the toy 20 placed on the input pad 40.

Figure 19:
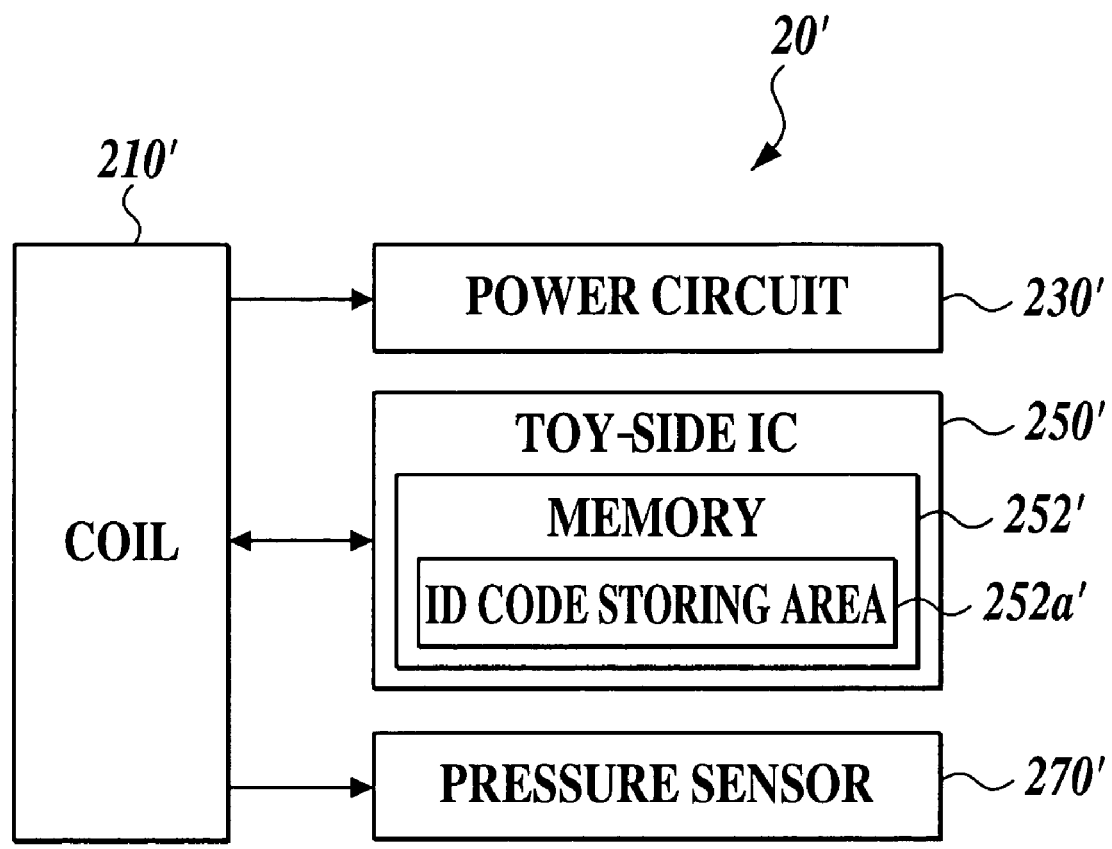
FIG. 19 is a block diagram showing one example of modifications for the internal configuration of the toy.

Additionally, when the player operates the toy on the input pad 40, the operational-object character may be operated according to the force applied to the toy from the outside thereof (gripping strength). FIG. 19 is a block diagram showing one example of internal configuration of the toy 20' in this case. The toys 20' shown in the diagram includes coil 210', power circuit 230', toy-side IC 250', and pressure sensor 270'. This configuration is added the pressure sensor 270' to the configuration of the toy 20 shown in FIG. 9A of the embodiment described above. The pressure sensor 270' is automatically enabled by the voltage supplied from the power circuit 230' to change the inductance of the coil 210' according to the force applied to the toy 20'.

The input pad 40 detects the position coordinates group of coils of the placed toy 20' and the gripping strength of the toy 20' using change of electric field produced by electromagnetic induction between the input pad 40 and the toy 20'. The input pad controller 44 generates and outputs to the game apparatus 10 the placement state information including the received ID code of the toy 20', the detected position coordinates group and gripping strength associated with each other.

On the other hand, in the game apparatus 10, for example, for the action data in the toy character information 460, motions of the operational-object character according to the amount of change of the gripping strength of the toy 20' may be defined in advance as the action pattern corresponding to the state change item "gripping strength". The state change detecting section 224 detects the amount of change of the gripping strength of the toy 20' according to the gripping strength of the toy 20' detected by the input pad 40, and outputs the amount of change to the fight controller 222. Then, the fight controller 222 reads and carries out the action pattern corresponding to the detected amount of change of the gripping strength of the toy 20'. Alternatively, parameter value relating to the attack power of the operational object character may be varied considering the gripping strength. For example, as explained in the above embodiment, when the fight controller 222, according to the state change item "right turn" input from the state change detecting section 224, causes the operational-object character to perform attack operation according to the corresponding action pattern stored in the toy character information 460, the parameter value relating to the attack power may be temporarily increased or decreased by a predetermined amount according to the gripping strength of the toy 20'. With this method, the operational-object character can be operated according to the force level by which the player grips the toy 20'.

Alternatively, the fight controller 222 may decide the size of the fighting area according to game progress, such as the number of enemy characters that the operational-object character has met before going into the fighting mode, or a place where it encounters the enemy character.

In the embodiment described above, when the game is in the fighting mode, a character imitating the figure of a toy 20 appears in the fighting screen as the operational-object character by placing the toy 20 on the input pad 40, and the operational-object character is operated by changing the placed position and the direction of the toy 20. But this operation is not limited to the fighting mode, and the operation of changing the placed position and the direction of the toy 20 may control the game progress like story development of the game.

In the above embodiment, a game applied to RPG is exemplified, but the invention is applicable to various games that are enjoyed by operating characters, as in sport games like soccer game and baseball game, and fighting games. For example, the invention may be applied to operational inputs of a soccer game. Specifically, a free-kick operation by an operational-object character may be controlled according to the operational inputs of a toy 20 on the input pad 40. That is, operations of the operational-object character may be controlled according to moving speed, path shapes at the time of movement of the toy 20 on the input pad 40, the operation including approach running speed, kick-motion timing, and ball-kicking directions.

In the above embodiment, a description is given of fighting against an enemy character by computer control with a player operating the toy 20 on the input pad 40. Instead of one input pad 40, by connecting two input pads 40 to the game apparatus 10, a first player operating a toy 20 on a first input pad 40 may fight against a second player operating a toy 20 on a second input pad 40 each other. In this case, the game apparatus 10 includes a fight controller 222' for controlling the fight between the first player and the second player. The apparatus 10 also includes a first state change detecting section for the first input pad 40 and a second state change detecting section for the second input pad 40, similar to the state change detecting section 224. The first and the second state change detecting sections detect the respective state changes of the toys 20 on the input pads 40, according to placement state information input from the respective input pads 40 at appropriate timing, and output them to the fight controller 222'. According to the state change of each toy 20 on the input pad 40, the fight controller 222' refers to the toy character information 460, reads and carries out action patterns corresponding to action data associated with the ID code of each toy 20 to control the fighting between the first player and the second player.

In the above embodiment, a description is given of appearing a toy character imitating the toy 20 on the fighting screen as an operational-object character of the player, by placing the toy 20 forming one of various figures on the input pad 40. Instead of this, by placing a card (printed matter), having a character picture printed thereon, on the input pad 40, the character printed on the card may appear on the fighting screen as the operational-object character of the player. That is, by placing the card on the input pad 40, the card having an embedded memory storing a model code identifying a character model printed on the card and an ID code including an identification code to identify the card, the game apparatus 10 identifies the card placed on the input pad 40, and causes the character printed on the card to appear on the fighting screen as the operational-object character of the player.

INDUSTRIAL APPLICABILITY

As practical applications for implementing the game apparatus 10 according to the present embodiment, the invention is not limited to the home-use game system described above, and may be applicable, for example, to portable terminals, such as portable game devices, personal computers, cellular phones and PDAs.

The invention claimed is:

1. An image generating method performed by an apparatus including a processor, the apparatus connected to an input system, the input system including a tablet using an electromagnetic induction method; and a formed object incorporating a coil for performing predetermined communication using an electro magnetic induction method when placed on the tablet, and a memory for storing identification information on the formed object, so that, when the formed object is placed on the tablet, the apparatus obtains from the input system a placed position and direction on the tablet, and identification information on the formed object, the method comprising:

detecting, with a processor a change of the placed position and direction obtained from the input system;

selecting with a processor character information corresponding to the identification information obtained from the input system out of a plurality of character information obtained from the input system out of a plurality of character information, each of which includes image information on a character imitating a figure of the formed object and is associated with the identification information on the formed object;

setting discretionarily, with a processor a size of a movement area correlating with a placement detectable area on the tablet, and setting the movement area in a game space;

controlling with a processor a display position of the character by disposing the character imitating the figure of the formed object in a position in the movement area correlating with the placed position of the formed object in the placement detectable area according to the selected character information, and controlling the character to perform an action according to a predetermined action pattern when the detected change satisfies a predetermined condition; and generating with a processor an image of the game space including the whole correlating area so that the character is displayed regardless of the size of the movement area and regardless of where in the placement detectable area a player places the formed object, wherein controlling the character is at least based on a detected amount of change of the gripping strength applied to the formed object, the detection being detected by a pressure sensor.

2. The image generating method as claimed in claim 1, the method further comprising:

determining a direction in the game space correlating with a direction of the formed object obtained from the input system according to a correlating positional relationship of the placement detectable area and the movement area, wherein controlling the character includes disposing the character at the position in the movement area correlating with the placed position in the determined direction.

3. The image generating method as claimed in claim 1, wherein setting the size of the movement area includes setting the size of the movement area set according to the selected character information.

4. The image generating method as claimed in claim 1, wherein setting the size the movement area includes setting the size of the movement area according to game progress.

5. The image generating method as claimed in claim 1, wherein the formed object comprises a pressure detecting part embedded therein for detecting pressure applied thereto from the outside thereof,
the input system comprises a detecting unit for detecting the pressure detected by the pressure detecting part with predetermined communication,
the method comprising:
obtaining from the input system the pressure detected by the detecting unit; and
controlling motion and movement of the character based on the pressure obtained from the input system.

6. The image generating method as claimed in claim 1, wherein
detecting the change includes detecting a turn direction and/or an amount of turn by detecting a change per predetermined unit time for the direction obtained from the input system, and
controlling the character includes controlling the character to perform the action according to the predetermined action pattern when the turn direction and/or the amount of turn satisfy the predetermined condition.

7. The image generating method as claimed in claim 1, wherein
detecting the change includes detecting a speed by detecting a change per predetermined unit time for the placed position obtained from the input system, and
controlling the character includes controlling the character to perform the action according to the predetermined action pattern when the speed satisfies the predetermined condition.

8. The image generating method as claimed in claim 1, wherein
detecting the change includes detecting a path by detecting a continuous change of the placed position obtained from the input system, and
controlling the character includes controlling the character to perform the action according to the predetermined action pattern when the path satisfies the predetermined condition.

9. The image generating method as claimed in claim 1, using an information storage medium storing a program for causing an apparatus including a processor to perform the method, wherein the storage medium being readable by the apparatus.

10. The image generating method as claimed in claim 1, wherein
the predetermined action patterns of the character differ depending on a predetermined threshold distance between the character being controlled in the game space.

11. An image generating method performed by an apparatus including a processor, the apparatus connected to an input system, the input system including a tablet using an electromagnetic induction method; and a printed matter, which has a character picture printed on the printing surface thereof, incorporating a coil for performing predetermined communication using an electromagnetic induction method when placed on the tablet, and a memory for storing identification information on the printed matter, so that, when the printed matter is placed on the tablet, the apparatus obtains from the input system a placed position and a direction on the tablet, and identification information on the printed matter, the method comprising:
detecting, with a processor a change of the placed position and the direction obtained from the input system;
selecting, with a processor character information corresponding to the identification information obtained from the input system from a plurality of character information, each of which includes image information on the character printed on the printed matter and is associated with identification information on the printed matter;
setting discretionarily, with a processor a size of movement area correlating with a placement detectable area on the tablet, and setting the movement area in a game space;
controlling, with a processor a display position of the character by disposing the character, printed on the printed matter in the position in the movement area correlating with the placed position of the printed matter in the placement detectable area according to the selected character information, and for controlling the character to perform an action according to a predetermined action pattern when the change detected by the change detecting unit satisfies a predetermined condition; and
generating, with a processor an image of the game space including the whole correlating area so that the character is displayed regardless of the size of the movement area the regardless of where in the placement detectable area a player places the printed matter,
wherein controlling the character is at least based on a detected amount of change of the gripping strength applied to the character printed on the printed matter, the detection being detected by a pressure sensor.

12. The image generating method as claimed in claim 11, wherein
detecting the change includes detecting a turn direction and/or amount of turn by detecting a change per predetermined unit time for the direction obtained from the input system, and
controlling the character includes controlling the character to perform the action according to the predetermined action pattern when the turn direction and/or the amount of turn satisfies the predetermined condition.

13. The image generating method as claimed in claim 11, wherein
detecting the change includes detecting a speed by detecting a change per predetermined unit time for the placed position obtained from the input system, and
controlling the character includes controlling the character to perform the action according to the predetermined action pattern when the speed satisfies the predetermined condition.

14. The image generating method as claimed in claim 11, wherein
detecting the change includes detecting a path by detecting a continuous change of the placed position obtained from the input system, and
controlling the character includes controlling the character to perform the action according to the predetermined action pattern when the path satisfies the predetermined condition.

15. The image generating method as claimed in claim 11, using an information storage medium storing a program for causing an apparatus including a processor to perform the method, wherein the storage medium being readable by the apparatus.

16. The image generating method as claimed in claim 11, wherein
the predetermined action patterns of the character differ depending on a predetermined threshold distance between the character being controlled in the game space and enemy objects in the game space.

17. A game apparatus connected to an input system, the input system comprising:
a tablet using an electromagnetic induction method; and
a formed object incorporating a coil for performing predetermined communication with the tablet using an electromagnetic induction method when placed on the tablet, and a memory for storing identification information on the formed object,
so that the apparatus obtains from the input system a placed position and a direction on the tablet, and identification information on the formed object when the formed object is placed on the tablet,
the apparatus comprising:
a change detecting unit for detecting a change of the placed position and the direction obtained from the input system;
a selecting unit for selecting character information corresponding to the identification information obtained from the input system out of a plurality of character information, each of which includes image information on a character imitating a figure of the formed object and is associated with the identification information on the formed object;
a correlating area setting unit for setting discretionarily a size of a movement area correlating with a placement detectable area on the tablet, and setting the movement area in a game space;
a character control unit for controlling a display position of the character by disposing the character imitating the figure of the formed object in the position in the movement area correlating with the placed position of the formed object in placement detectable area according to the character information selected by the selecting unit, and for controlling the character to perform an action according to a predetermined action pattern when the change detected by the change detecting unit satisfies a predetermined condition; and
an image generating unit for generating an image of the game space including the whole correlating area so that the character is displayed regardless of the size of the movement area and regardless of where in the placement detectable area a player places the formed object,
wherein the image generation unit controls the character at least based on a detected amount of change of the gripping strength applied to the formed object, the detection being detected by a pressure sensor.

18. A game apparatus connected to an input system, the input system comprising:
a tablet using an electromagnetic induction method; and
a printed matter, which has a character picture on a printing surface thereof, incorporating a coil for performing predetermined communication using an electromagnetic induction method when placed on the tablet, and a memory for storing identification information on the printed matter,
so that the apparatus obtains from the input system a placed position and a direction on the tablet, and identification information on the printed matter when the printed matter is placed on the tablet,
the apparatus comprising:
a change detecting unit for detecting a change of the placed position and the direction obtained from the input system;
a selecting unit for selecting character information corresponding to the identification information obtained from the input system out of a plurality of character information, each of which includes image information on a character printed on the printed matter and is associated with the identification information on the printed matter;
a correlating area setting unit for setting discretionarily a size of a movement area correlating with a placement detectable area on the tablet, and setting a position of the movement area in a game space;
a selecting unit for selecting character information corresponding to the identification information obtained from the input system out of a plurality of character information, each of which includes image information on a character printed on the printed matter and is associated with the identification information on the printed matter;
a correlating area setting unit for setting discretionarily a size of a movement area correlating with a placement detectable area on the tablet, and setting a position of the movement area in a game space;
a character control unit for controlling a display position of the character by disposing the character printed on the printed matter in the pin the position in the movement area correlating with the placed position of the printed matter in the placement detectable area according to the character information selected by the selecting unit, and for controlling the character to perform an action according to a predetermined action pattern when the change detected by the change detecting unit satisfies a predetermined condition; and
an image generating unit for generating an image of the game space including the whole correlating area so that the character is displayed regardless of the size of the movement area and regardless of where in the placement detectable area a player places the printed matter.

* * * * *